(12) United States Patent
Gottlieb et al.

(10) Patent No.: US 10,559,005 B2
(45) Date of Patent: *Feb. 11, 2020

(54) SYSTEMS AND METHODS FOR GENERATING AND MAINTAINING INTERNET USER PROFILE DATA

(71) Applicant: Pathmatics, Inc., Santa Monica, CA (US)

(72) Inventors: Gabriel Gottlieb, Santa Monica, CA (US); Thomas George Lorimor, Santa Monica, CA (US)

(73) Assignee: PATHMATICS, INC., Santa Monica, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 15/583,764

(22) Filed: May 1, 2017

(65) Prior Publication Data

US 2017/0236157 A1 Aug. 17, 2017

Related U.S. Application Data

(63) Continuation of application No. 13/781,472, filed on Feb. 28, 2013, now Pat. No. 9,646,095.

(Continued)

(51) Int. Cl.
*G06F 17/30* (2006.01)
*G06Q 30/02* (2012.01)
*G06F 16/9535* (2019.01)

(52) U.S. Cl.
CPC ..... *G06Q 30/0255* (2013.01); *G06F 16/9535* (2019.01); *G06Q 30/0254* (2013.01); *G06Q 30/0269* (2013.01); *G06Q 30/0277* (2013.01)

(58) Field of Classification Search
CPC .......................... G06F 17/30864; G06Q 30/02
See application file for complete search history.

(56) References Cited

U.S. PATENT DOCUMENTS 6,665,658 B1 * 12/2003 DaCosta ........... G06F 17/30864
7,546,370 B1 * 6/2009 Acharya ........... G06F 17/30864
709/223

(Continued)

FOREIGN PATENT DOCUMENTS

EP           1662366 A1     5/2006
WO    WO-2009/078861 A1    6/2009
WO     WO 2009078861 A1 *  6/2009 ............. G06Q 30/02

OTHER PUBLICATIONS

Gottleib et al., U.S. Appl. No. 13/527,535, filed Jun. 19, 2012.

*Primary Examiner* — Apu M Mofiz
*Assistant Examiner* — Farhad Agharahimi
(74) *Attorney, Agent, or Firm* — McDermott Will & Emery LLP

(57) ABSTRACT

Systems and methods are provided for automatically generating and maintaining user profile cookie sets. The user profile cookie sets may be used by a web crawler when gathering data such as advertisement data associated with one or more websites. The cookie sets may be generated by choosing a user profile with a set of user traits, selecting a set of websites related to the user traits, and browsing the selected set of websites using a web crawler while allowing the website to place cookies in storage of the web crawler. The cookie sets may be maintained by selecting a website to browse, selecting a user profile associated with the selected website, loading a previously generated cookie set for the selected user profile into the storage of a web crawler, and loading the webpage while allowing the website to place, update, or replace cookies in the storage of the web crawler.

20 Claims, 16 Drawing Sheets

Related U.S. Application Data

(60) Provisional application No. 61/605,392, filed on Mar. 1, 2012.

(56) References Cited

U.S. PATENT DOCUMENTS

| | | | |
|---|---|---|---|
| 8,050,970 B2 | 11/2011 | Barry et al. | |
| 8,239,263 B2 | 8/2012 | Axe et al. | |
| 8,386,314 B2 | 2/2013 | Kirkby et al. | |
| 8,392,241 B2 | 3/2013 | Coladonato et al. | |
| 8,554,602 B1 | 10/2013 | Zohar et al. | |
| 8,655,695 B1 | 2/2014 | Qu et al. | |
| 8,745,753 B1 | 6/2014 | Gottlieb et al. | |
| 2001/0049701 A1* | 12/2001 | Howerton, III | G06F 17/211 715/205 |
| 2002/0111994 A1* | 8/2002 | Raghunandan | G06F 17/30867 709/203 |
| 2002/0156781 A1* | 10/2002 | Cordray | G06F 17/30861 |
| 2003/0023511 A1* | 1/2003 | Gardner, Sr. | G06Q 30/02 705/26.8 |
| 2004/0205049 A1 | 10/2004 | Aggarwal | |
| 2005/0021397 A1 | 1/2005 | Cui et al. | |
| 2005/0222902 A1 | 10/2005 | Coit et al. | |
| 2008/0215417 A1 | 9/2008 | Young | |
| 2008/0256536 A1* | 10/2008 | Zhao | G06F 9/45537 718/1 |
| 2009/0083134 A1* | 3/2009 | Burckart | G06Q 30/0224 705/14.25 |
| 2009/0165145 A1* | 6/2009 | Haapsaari | H04M 1/72563 726/28 |
| 2009/0222316 A1 | 9/2009 | Boinepalli et al. | |
| 2010/0070621 A1* | 3/2010 | Urdan | H04L 43/04 709/224 |
| 2010/0161385 A1 | 6/2010 | Karypis et al. | |
| 2010/0241510 A1 | 9/2010 | Zhang | |
| 2011/0049701 A1 | 3/2011 | Miyagawa | |
| 2011/0072131 A1 | 3/2011 | Zohar et al. | |
| 2011/0125587 A1 | 5/2011 | Netzer et al. | |
| 2011/0218866 A1 | 9/2011 | Wilson | |
| 2011/0282860 A1 | 11/2011 | Baarman et al. | |
| 2012/0271805 A1* | 10/2012 | Holenstein | G06F 17/30876 707/706 |
| 2013/0018723 A1 | 1/2013 | Khanna | |

\* cited by examiner

SYSTEMS AND METHODS FOR GENERATING AND MAINTAINING INTERNET USER PROFILE DATA

This application is a continuation application of U.S. application Ser. No. 13/781,472, filed Feb. 28, 2013, which claims the benefit of provisional patent application No. 61/605,392, filed Mar. 1, 2012, all of which are hereby incorporated by reference herein in their entirety.

BACKGROUND OF THE INVENTION

This invention relates generally to web-based information and, more specifically, to systems for generating and maintaining user profile data for web crawling applications.

Publishers of websites such as newspaper web pages, television station web pages, web log web pages, magazine web pages, social networking web pages, microblogging web pages, and other internet-based online publishing sources often place data onto the computing system of a user of the website when the user loads the website.

The data that is placed by the publisher is often referred to as a cookie. When the user returns to the website at a later time, the publisher detects the presence of the cookie on the user's computing system. The publisher often alters the content of the website based on the detected cookie and additional data associated with that user that is stored by the publisher.

For example, the publisher website may place advertisements, articles, or other content on the website that are targeted to that particular user. In some scenarios, third party companies such as data gathering companies also place cookies onto user's computing equipment.

Data tracking systems sometimes use web crawlers to gather data about the content of a given publisher webpage. In some scenarios it would be beneficial to be able to simulate various types of human website users using cookies. However, because human users visit a variety of websites and because cookies often have expiration dates and times, it can be challenging to obtain a set of cookies that is useful for simulating human users.

It would therefore be desirable to be able to provide improved systems for generating and maintaining user profile data such as user profile cookie sets.

SUMMARY OF THE INVENTION

Systems and methods are provided for generating and maintaining user profile cookie sets. The user profile cookie sets may be used for simulating an internet user having a specific user profile. For example, a data collection system may use the user profile cookie sets to simulate a user of a website while gathering data such as advertisement data associated with advertisements that are displayed on the website.

A system such as a cookie set generating and maintenance system may include cookie harvesting computing equipment, one or more databases, and one or more proxy servers.

The cookie harvesting computing equipment may include computing equipment for running one or more web crawling applications. The computing equipment may include storage such as cookie storage for storing the cookie sets as they are generated and updated.

The databases may include a user profile database and a site-specific user population database. The user profile database may include user profiles for simulated human internet users and one or more cookie sets associated with each user profile. Each user profile may include a set of user traits such as a gender, an age, an income, and a list of interests or interest keywords for that user. A cookie set associated with each set of user traits may be a cookie set that is indicative of a typical human user with that set of user traits.

The site-specific user population database may include user population segmentation data specific to each of a plurality of websites. The site-specific segmentation data may include statistical data about the people that access that website such as the percentage of people in a given age range or income range that visit the website.

The system may be configured to generate and maintain one or more cookie sets for each user profile.

Generating the cookie sets may include selecting a user profile, obtaining site-specific segmentation data for a plurality of websites, selecting a set of websites using the user profile and the site-specific segmentation data, and using a web crawler to load each of the selected set of websites while allowing each website to place and edit cookies in the cookie storage of the web crawler. The system may then place the cookies in the web crawler cookie storage into the user profile database in a location that is associated with the selected user profile.

Maintaining the cookie sets may include selecting a website to explore, obtaining site-specific segmentation data for that website, selecting a user profile, selecting a cookie set for that user profile, moving the selected cookie set to a web crawler cookie storage, using the web crawler to load the selected website while allowing the website publisher to update the cookies in the cookie storage of the web crawler, and storing the updated cookie set in the user profile database.

Additional website analysis operations such as advertisement tracking and discovery operations may be performed while the cookie set is being updated.

Further features of the invention, its nature and various advantages will be more apparent from the accompanying drawings and the following detailed description of the preferred embodiments.

DETAILED DESCRIPTION

Figure 1:
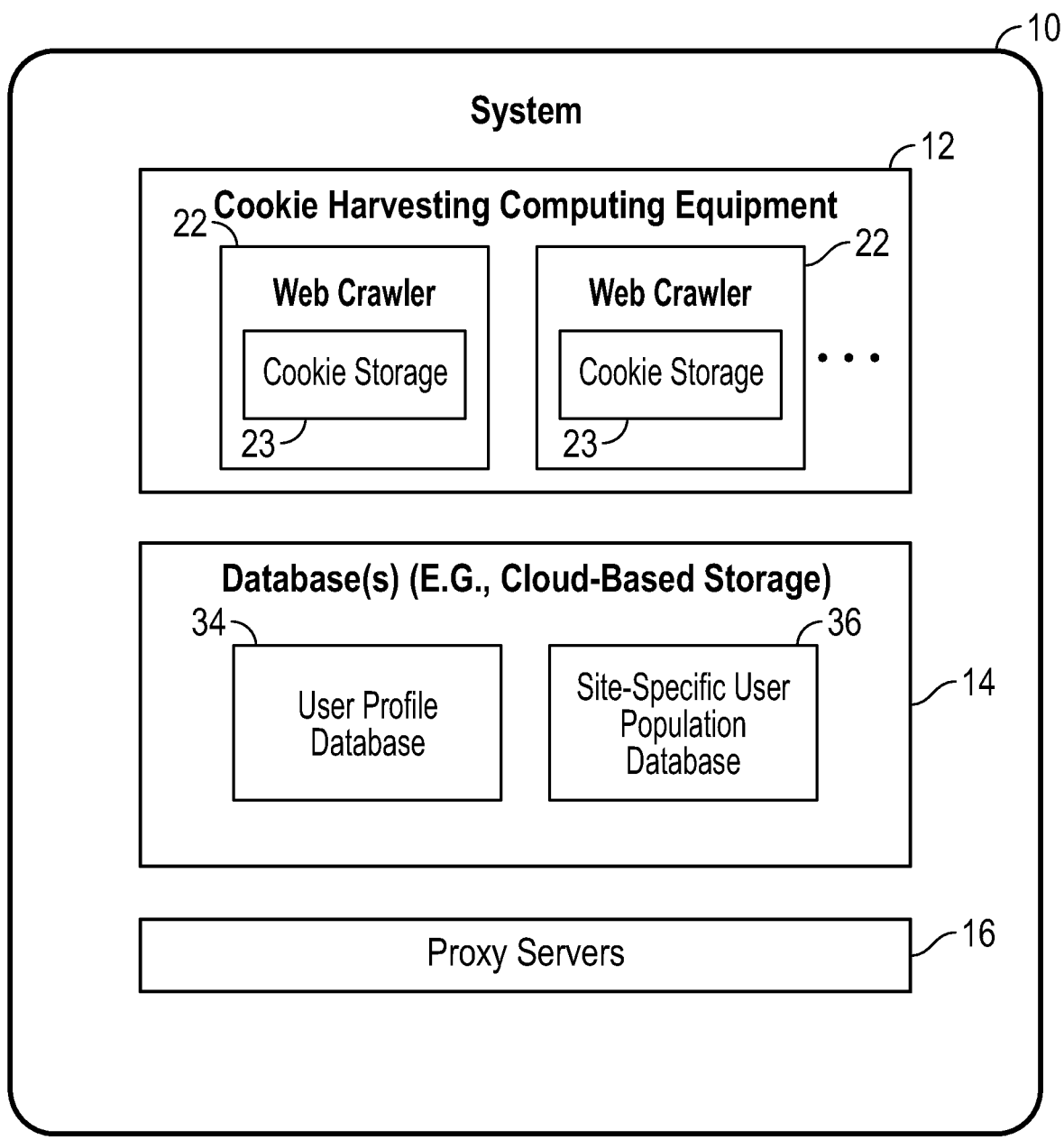
FIG. 1 is a diagram of an illustrative system for generating and maintaining user profile cookie sets in accordance with an embodiment of the present invention.

An illustrative system for generating and maintaining user profile cookie sets is shown in FIG. 1. System 10 may be used to generate cookie sets to be used while simulating a human internet user browsing a webpage. System 10 may also be used to automatically maintain the generated cookie sets. System 10 may, if desired, by embedded in a larger system for performing website analysis operations such as advertisement discovery and tracking operations, if desired.

System 10 (sometimes referred to herein as user profile cookie generation and maintenance system 10) may include cookie harvesting computing equipment 12, one or more databases 14, and one or more remote servers such as proxy servers 16. Cookie harvesting computing equipment 12 may include one or more personal computers, workstations, computers configured as servers, mainframe computers, portable computers, etc. Equipment 12 may include processing circuitry, displays, input-output devices, and storage (e.g., hard drives, volatile memory, non-volatile memory, and other storage media). Equipment 12 may be used to run code for software applications such as one or more web crawling applications 22.

Each web crawler 22 may include storage such as cookie storage 23 for storing one or more cookies in a cookie set while browsing (crawling) one or more web pages. Cookie storage 23 may include storage space in storage media such as hard drives, volatile memory, non-volatile memory, and other storage media that are co-located with web crawler 22 or that are remotely accessible by web crawler 22.

System 10 may include one or more databases 14. Databases 14 may be co-located with cookie harvesting computing equipment 12 of system 10 and/or may include remote storage such as cloud-based storage. If desired, cookie harvesting computing equipment 12 may be used to access stored information from databases 14 and/or provide information to databases 14. Databases 14 may include information stored on storage media such as hard drives, volatile memory, non-volatile memory, and other storage media associated with workstations, computers configured as servers, mainframe computers, portable computers, etc.

Databases 14 may include one or more databases such as user profile database 34 and site-specific user population database 36. User profile database 34 may be used to store user profiles associated with human internet users to be simulated by system 10. User profiles stored in user profile database 34 may each include a set of user traits and one or more sets of cookies (e.g., web browser cookies, Hypertext Transfer Protocol (HTTP) cookies, etc.) associated with each set of user traits. Site-specific user population database 36 may be used to store statistical data associated with the population of users that access one or more particular websites.

Cookie harvesting computing equipment 12 may access data from user profile database 34 and/or site-specific user population database 36, may select a user profile from user profile database 34, may select a cookie set associated with the selected user profile, may provide generated cookie sets and/or updated cookie sets to user profile database 34 or may perform other cookie generating and maintenance operations for system 10.

Cookie harvesting computing equipment 12 may be implemented using multiple virtual computers on a common computing platform, using separate computing platforms in a common room in a building, using separate computing platforms in separate rooms in a common building, using separate computing platforms in a common geographical location (e.g., a common city), or using multiple computing platforms in multiple geographical locations. As examples, cookie harvesting computing equipment 12 may include separate computing platforms that are located in multiple different cities.

Cookie harvesting computing equipment 12 may use web crawler(s) 22 to generate and maintain one or more cookie sets for each user profile.

For example, equipment 12 may be used to generate the cookie sets by selecting a user profile, obtaining site-specific segmentation data for a plurality of websites, selecting a set of websites using the user profile and the site-specific segmentation data, and using a web crawler to load each of the selected set of websites while allowing each website to place and edit cookies in the cookie storage of the web crawler. Cookies in the generated cookie set in the web crawler cookie storage may then be moved into the user profile database in a location that is associated with the selected user profile.

As another example, equipment 12 may be used to maintain and update the cookie sets by selecting a website to explore, obtaining site-specific segmentation data for that website, selecting a user profile, selecting a cookie set for that user profile, obtaining the selected cookie set from the user profile database, and using the web crawler to load the selected website while allowing the website publisher to update the cookies in the cookie storage of the web crawler. Updated cookies in the generated cookie set in the web crawler cookie storage may then be moved into the user profile database in a location that is associated with the selected user profile.

Figure 2:
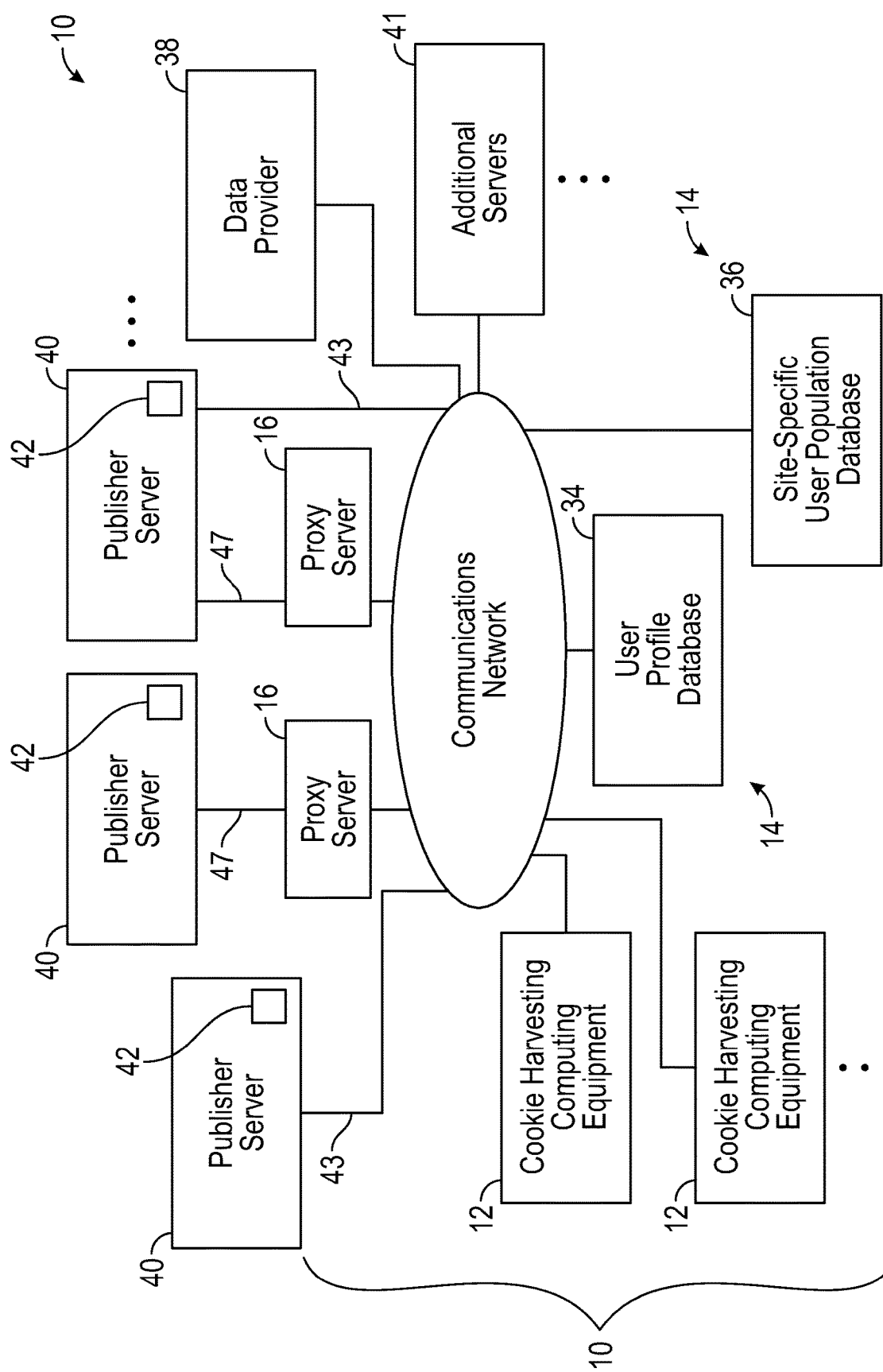
FIG. 2 is an illustrative diagram showing how portions of a system of the type shown in FIG. 1 may communicate with other portions of the system and with publisher servers and data providers over a communications network in accordance with an embodiment of the present invention.

FIG. 2 shows how portions of system 10 may communicate with other portions of system 10, with publisher computing equipment such as publisher servers 40, and/or with data providers such as data provider 38 over a communications network such as communications network 44. Communications network 44 may be a local area network, a wide area network such as the internet, or a combination of one or more local area networks and a wide area network.

As shown in FIG. 2, system 10 may include multiple implementations of cookie harvesting computing equipment 12 connected to one or more of multiple publisher servers 40 over network 44.

One or more web crawlers 22 (see FIG. 1) running on each implementation of cookie harvesting computing equipment 12 may be used to access and explore one or more publisher web pages 42 that are hosted on publisher servers 40. If desired, web crawlers 22 running on cookie harvesting computing equipment 12 in one geographical location (e.g., a country or a region of a country) may be used to access and explore publisher web pages in that geographical location. However, this is merely illustrative. If desired, web crawling applications 22 running on cookie harvesting computing equipment 12 in one geographical location may access publisher servers 40 in another geographical location (e.g., another country or another region of a country) directly (as indicated by lines 43) or though a proxy server 16 (as indicated by lines 47) that is located in a common geographical location (e.g., a common country or region of a country) with those publisher servers 40.

During operation of system 10, cookie harvesting computing equipment 12 may select a user profile from user profile database 34, obtain site-specific segmentation data from database 36 and generate or update a cookie set for that selected user profile.

Cookie harvesting equipment 12 may generate and update user profile cookie sets by selecting websites associated with a user profile and using web crawlers 22 to access the selected websites while permitting the website or a third party to place and/or update cookies in the cookie storage of the web crawler. For example, cookie harvesting equipment 12 may load a web page associated with a publisher server using one of web crawlers 22. While loading the web page, the publisher server may instruct the web crawler (web browser) to load one or more assets from additional servers 41. These assets may include HTML assets, scripts, image files, videos, etc. When loading these assets from additional servers 41, servers 41 may instruct the web crawler 22 to load more assets from other servers, and so on. Cookie harvesting equipment 12 may allow any of publisher servers 40 and/or additional servers 41 to read, write, and/or update cookies in the web crawler cookie storage during this process.

Figure 3:
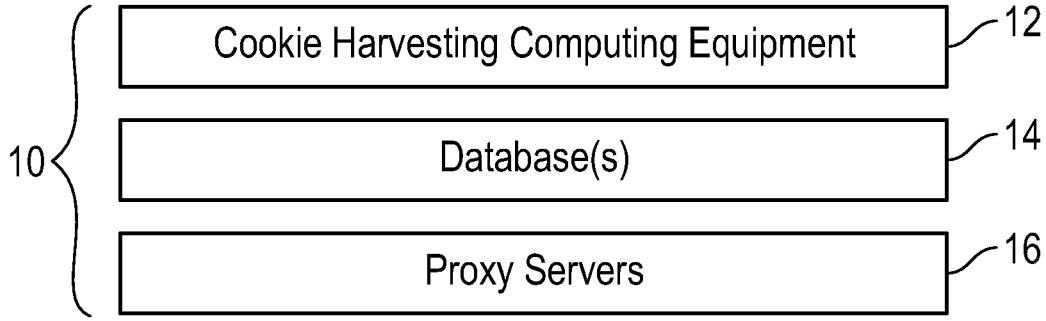
FIG. 3 is a diagram showing how a user profile cookie set generating and maintaining system may be embedded in an advertisement discovery and tracking system in accordance with an embodiment of the present invention.

As shown in FIG. 3, cookie harvesting computing equipment 12 may be implemented as a portion of a larger data gathering and analysis system such as advertisement tracking and discovery system 99.

System 99 may include advertisement discovery equipment 13, data analysis and storage equipment 17, customer interface equipment 18 or other computing equipment.

Advertisement discovery equipment 13 may include computing equipment 20. Computing equipment 20 may include one or more personal computers, workstations, computers configured as servers, mainframe computers, portable computers, processing circuitry, displays, input-output devices, and storage (e.g., hard drives, volatile memory, non-volatile memory, and other storage media). Computing equipment 20 of advertisement discovery equipment 13 may be used to run code for software applications such as one or more additional web crawling applications 22 and data processing applications such as data reduction application 24. Data reduction application 24 may be used to process advertisement related data that has been gathered using web crawler(s) 22 (e.g., modified web crawling web browsers or dedicated web crawling applications).

Each web crawler 22 of advertisement discovery equipment 13 may also include storage for storing a cookie set that has been generated by cookie generation and maintenance system 10 while browsing (crawling) one or more web pages. Cookie storage of advertisement discovery equipment 13 may include storage space in storage media such as hard drives, volatile memory, non-volatile memory, and other storage media that are co-located with web crawler 22 or that are remotely accessible by web crawler 22.

Advertisement discovery equipment 13 may access data from user profile database 34 and/or site-specific user population database 36, may select a user profile from user profile database 34, may select a cookie set associated with the selected user profile or may perform other user-simulating operations for system 99. However, this is merely illustrative. If desired, data analysis and storage equipment 17 may be used to access data from user profile database 34 and/or site-specific user population database 36, to select a user profile from user profile database 34, to select a cookie set associated with the selected user profile, to initiate transfers of data between databases 14 and advertisement discovery equipment 13 or to perform other user-simulating operations for system 99 using cookie sets generated by system 10.

Data analysis and storage equipment 17 may include computing equipment 20. Computing equipment 20 of data analysis and storage equipment 17 may be co-located with computing equipment 20 of advertisement discovery equipment 13 or computing equipment 20 of data analysis and storage equipment 17 may be separate from computing equipment 20 of advertisement discovery equipment 13.

As examples, cookie harvesting computing equipment 12, computing equipment 20 of data analysis and storage equipment 17 and computing equipment 20 of advertisement discovery equipment 13 may be implemented using multiple virtual computers on a common computing platform, using separate computing platforms in a common room in a building, using separate computing platforms in separate rooms in a common building or using separate computing platforms in a common geographical location (e.g., a common city). However, this is merely illustrative. If desired, cookie harvesting computing equipment 12 may include multiple computing platforms in multiple geographical locations that are separated from computing equipment 20 of data analysis and storage equipment 17 and computing equipment 20 of advertisement discovery equipment 13.

If desired, cookie harvesting computing equipment 12 may be used to perform some or all of the functions of computing equipment 20 of advertisement discovery equipment 13 or computing equipment 20 of advertisement discovery equipment 13 may be used to perform some or all of the functions of cookie harvesting computing equipment 12.

Advertisement discovery equipment 13 may use web crawler(s) 22 to access and explore publisher web pages, gather advertisement related data from those publisher web pages, process the gathered data, and provide the processed data to data analysis and storage equipment 17. Data analysis and storage equipment 17 may be used to accumulate, aggregate, and store advertisement related data.

Computing equipment 20 of data analysis and storage equipment 17 may include storage such as one or more databases 28 and other computing equipment (e.g., one or more personal computers, workstations, computers configured as servers, mainframe computers, portable computers, processing circuitry, displays and input-output devices) that can be used to run code for software applications such as one or more data aggregation and distribution applications 30. Data aggregation and distribution applications 30 may be used to accumulate and aggregate data received from advertisement discovery equipment 13 and, if desired, to generate customer alert emails.

Customer interface equipment 18 may be used to provide a customer with access to advertisement related information such as aggregated advertisement data stored in data analysis and storage equipment 17. Computing equipment 20 of customer interface equipment 18 may include one or more personal computers, workstations, computers configured as servers, mainframe computers, portable computers, etc.

Computing equipment 20 of customer interface equipment 18 may include processing circuitry, displays, input-output devices, and storage (e.g., hard drives, volatile memory, non-volatile memory, and other storage media). Computing equipment 20 of customer interface equipment 18 may form a portion of computing equipment 20 of data analysis and storage equipment 17 or may be formed separately from computing equipment 20 of data analysis and storage equipment 17.

Computing equipment 20 of customer interface equipment 18 may be used to run code for software applications such as one or more communications applications 32. Communications applications 32 may be used to provide customers with access to advertisement related information such as user-profile sorted aggregated advertisement data that is stored in data analysis and storage equipment 17.

Communications applications 32 may include a web portal for providing authenticated web access to portions of data stored in data analysis and storage equipment 17 (e.g., using a customer's web browser), a file-transfer-protocol application for providing bulk access to portions of data stored in data analysis and storage equipment 17, an Application Programming Interface (API), and/or an email generating application that generates and sends alert emails to customers (e.g., periodic alert emails or emails generated in response to a detected change in advertisement related information).

Figure 4:
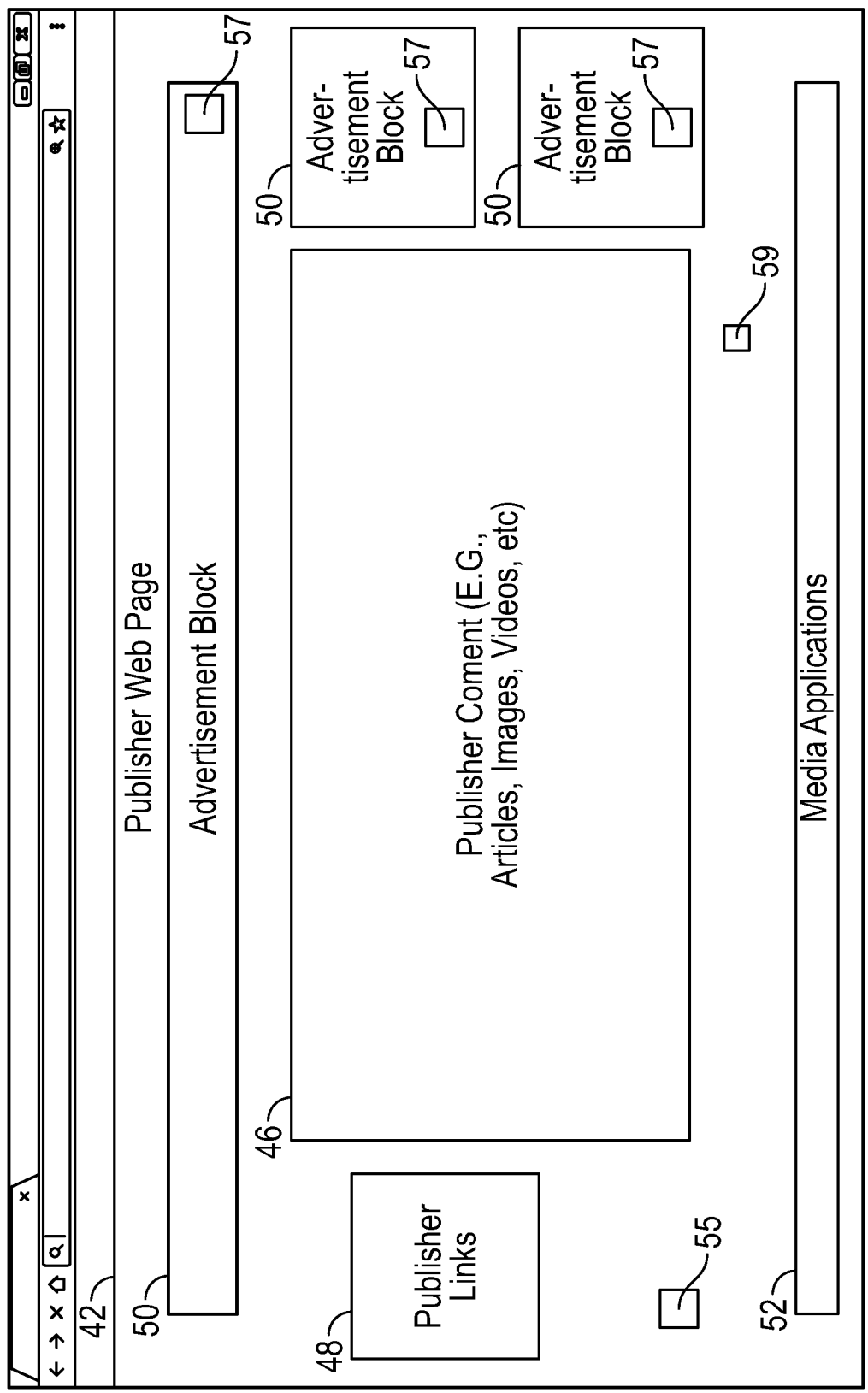
FIG. 4 is a diagram of an illustrative publisher web page in accordance with an embodiment of the present invention.

FIG. 4 is a diagram of a publisher website such as one of web pages 42 of FIG. 2. As shown in FIG. 4, publisher web page 42 may include publisher content 46 (e.g., an article, a movie or an image), publisher links 48 (e.g., clickable links to other publisher web pages), media applications 52 (e.g., social networking applications), one or more advertisement blocks 50, one or more cookies 59, and, if desired, an object 55 such as a link to an advertisement discovery script or an embedded advertisement discovery script. Objects such as object 55 may be, if desired, be generated and placed on website 42 using script generation and execution equipment associated with data analysis and storage equipment 17 of system 99.

Each advertisement block 50 may include one or more advertisements 57. Each advertisement 57 may be, as examples, an advertiser-related image, video, animation, text link, or other advertisement. Advertisements 57 may sometimes be referred to as advertiser creatives or simply as creatives. For example, an advertiser creative may include a jpeg image of a product and an embedded clickable link to a web site that sells that product.

System 99 may be used to identify advertisement blocks 50, to identify advertisers that advertise in those advertisement blocks, to record individual advertiser creatives 57 or text links displayed in those advertisement blocks, and to identify advertising channels that placed those advertiser creatives or text links in those advertisement blocks.

Some or all of advertisements 57 may be placed on web page 42 in response to detection of a set of cookies stored by a web browser or crawler when page 42 is loaded. For example, if page 42 is loaded by a human user that has recently visited multiple sports-related web pages, the human user's browser may have obtained sports-related cookies that identify the user as a sports enthusiast.

In response to detection of those sports-related cookies, advertisements 57 may be placed on page 42 that are for sports-related products. In another example, system 99 may provide one of crawlers 22 of advertisement discovery equipment 13 with a user profile cookie set from system 10 associated with a user profile of a user that is a sports enthusiast. In response to detection of sports-related cookies in that cookie set, advertisements 57 may be placed on page 42 that are for sports-related products. In this way, system 99 may induce web page 42 into presenting ads that are commonly presented to various types of human user.

System 10 may be used to generate and maintain this type of user profile cookie set. System 10 may, for example, use one of web crawlers 22 of cookie harvesting computing equipment 12 to load a website such as website 42 using an empty cookie set and may download cookie 59 into cookie storage of the web crawler. However, this is merely illustrative. If desired, system 10 may, for example, use one of web crawlers 22 of cookie harvesting computing equipment 12 to load a website such as website 42 using a previously generated cookie set and may replace a previously downloaded cookie in the cookie storage of the web crawler with an updated cookie such as cookie 59.

System 10 may be used to browse a web page such as web page 42 while generating and updating user profile cookie sets for each of one, two, three, more than three, ten, more than ten, hundreds, thousands, or millions of different types of human users using user profiles of those types of human users. If desired, system 10 may browse a web page such as web page 42 multiple times while updating multiple cookie sets for the same type of human user or while generating multiple new cookie sets for the same type of human user.

If desired, data gathering systems such as system 99 may use user profile cookie sets generated by system 10 to compile, analyze and display web-based data such as advertisement data associated with advertisements 57, advertisers associated with advertisements 57, advertising channels that place advertisements 57, and publishers that publish advertisements 57 to a customer.

Figure 5:
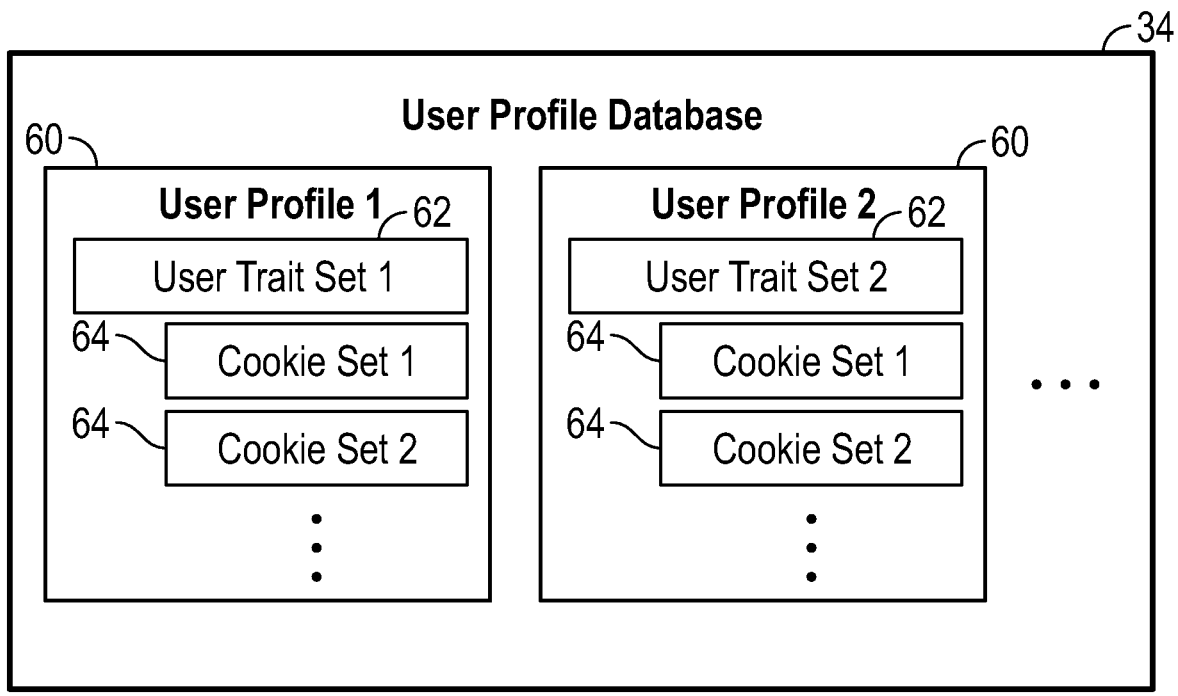
FIG. 5 is a diagram of illustrative user profile data such as user trait sets and associated cookie sets that may be stored in a user profile database in accordance with an embodiment of the present invention.

FIG. 5 is a diagram of user profile database 34 showing the type of data that may be stored in the database. As shown in FIG. 5, database 34 may include data associated with one or more user profiles 60. Each user profile 60 may have an associated set of user traits such as user trait sets 62. Each user profile 60 may also include one or more cookie sets 64 associated with the user trait set of that user profile. Cookie sets 64 associated with each user profile 60 may be generated and maintained (updated) using cookie harvesting computing equipment 12.

Cookie harvesting computing equipment 12 may be used to generate multiple cookie sets (e.g., COOKIE SET 1 and COOKIE SET 2 of USER PROFILE 1) associated with a first user profile (USER PROFILE 1) that includes an associated first user trait set (USER TRAIT SET 1) and multiple cookie sets (e.g., COOKIE SET 1 and COOKIE SET 2 of USER PROFILE 2) associated with a second user profile (USER PROFILE 2) that includes an associated second user trait set (USER TRAIT SET 2), etc.

User profile database 34 may include one, two, three, more than three, ten, more than ten, hundreds, more than hundreds, thousands, more than thousands, millions or more than millions of user profiles 60. Cookie harvesting computing equipment 12 may be used to generate one, two, three, more than three, ten, more than ten, hundreds, more than hundreds, thousands, more than thousands, millions or more than millions of cookie sets 64 associated with the user trait set of each user profile. Each user trait set 62 may be a particular combination of user traits 66 of the type shown in FIG. 6.

Figure 6:
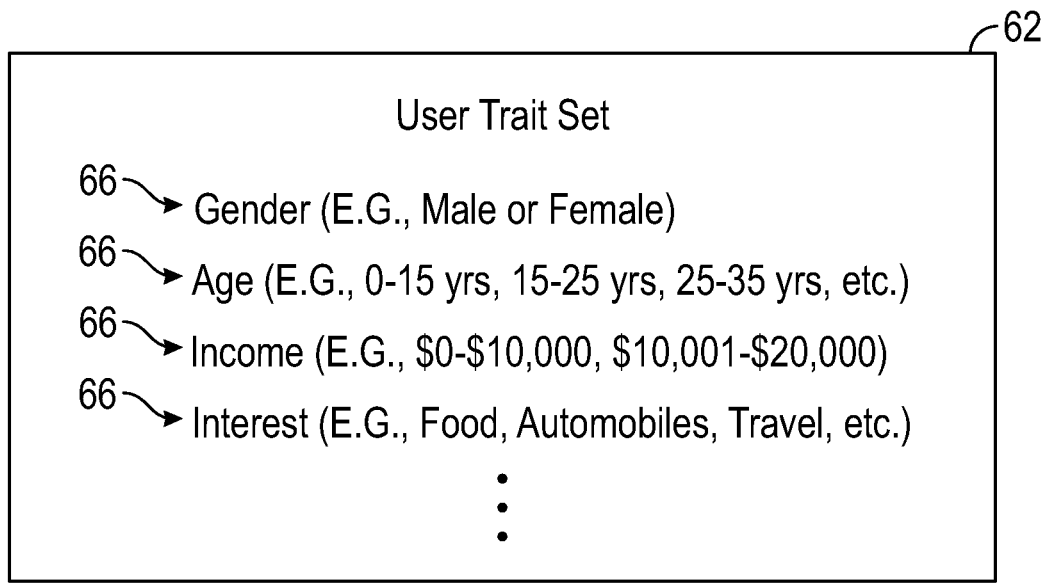
FIG. 6 is a diagram of an illustrative user trait set in accordance with an embodiment of the present invention.

As shown in FIG. 6, a user trait set 62 may include one or more user traits 66. Each user trait set 62 may be defined by the particular combination of user traits 66 in that user trait set. User traits 66 may include a user gender (e.g., male or female), a user age or user age range (e.g., 0-15 years (YRS) of age, 15-25 years of age, 25-35 years of age, 35-45 years of age, 45-55 years of age, 55-65 years of age, 65-75 years of age, 75-85 years of age, 85-95 years of age, 95-105 years of age, more than 65 years of age, less than 65 years of age, more than 30 years of age, less than 30 years of age, or any other suitable age or age range), a user income or income range (e.g., $0-$10000, $10001-$20000, $20001-$30000, $30001-$40000, $40001-$50000, $50001-$60000, $60001-$70000, $70001-$80000, $80001-$90000, $90001-$100000, $100001-$110000, $110001-$120000, $120001-$130000, $130001-$140000, $140001-$150000, $150001-$160000, $160001-$170000, $170001-$180000, $180001-$190000, $190001-$200000, more than $200000, less than $200000, more than $250000, less than $250000, more than $30000, less than $30000, or any other suitable income value or income rage), one or more user interests (e.g., food, automobiles, travel, sports, music, fishing, literature, shoes, computers, crafts, art, theater, scuba diving, television, movies, electronics, games, gaming, or other user interests), or any other user suitable traits (e.g., weight, height, education level, religion, etc.).

Each user trait set 62 may be formed from a particular combination of user traits 66. For example, a user trait set may be defined by user traits: male, 25-35 years of age, $50,000-$60,000 income, interested in travel. Another user trait set may be defined by: female, 55-65 years of age, $90,000-$100,000 income, interested in travel, music, and art. User profile database 34 may include user profiles having user trait sets that include any number of non-contradictory user traits 66.

As a typical human internet user browses web pages on the internet, some web page publishers and other data gathering organizations may instruct the user's browser to download one or more cookies onto the user's computer. The publishers or data gathering organizations often store data associated with the web sites and products that user views on the internet. Later, those cookies can be detected by the publisher or the data gatherer and the publisher or data gatherer can access the stored data associated with those cookies and determine the type of content and products that user is interested in. Advertisements can then be presented that are related to the interests of that specific user.

Figure 7:
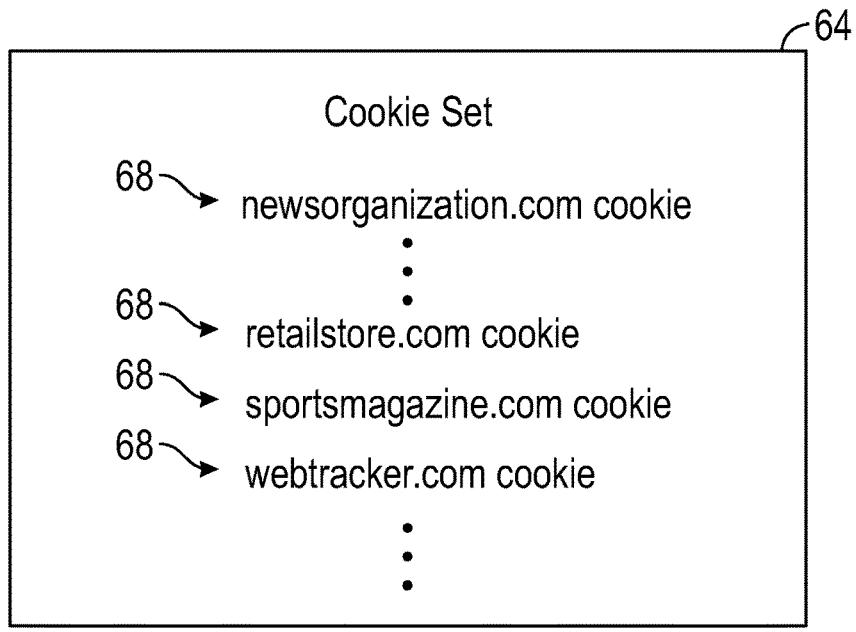
FIG. 7 is a diagram of an illustrative cookie set that may be associated with a user trait set of the type shown in FIG. 5 in accordance with an embodiment of the present invention.

A typical human user will therefore have a set of browser cookies stored on their computer that indicate the user traits of that user. Cookie harvesting equipment 12 may be used to generate cookie sets 64 that resemble or match the set of browser cookies of a particular type of human user. As shown in FIG. 7, a given cookie set 64 may include a cookie 68 associated with a news organization (e.g., a NEWSORGANIZATION.COM cookie), a cookie 68 associated with a retail store (e.g., a RETAILSTORE.COM cookie), a cookie 68 associated with a sports magazine (e.g., a SPORTSMAGAZINE.COM cookie), a cookie 68 associated with a data gathering organization that tracks user browsing movements across multiple publisher web pages (e.g., a WEBTRACKER.COM cookie) or any other suitable cookie. The news organization, the retail store, the sports magazine, and the data gathering organization may each store data linked with their cookie 68.

Because various internet users with the same user traits (e.g., two 25 year old male internet users with incomes between $35000 and $45000) will typically visit different web pages and view different products, system 10 may generate and store, multiple different cookie sets for each user trait set 62.

Figure 8:
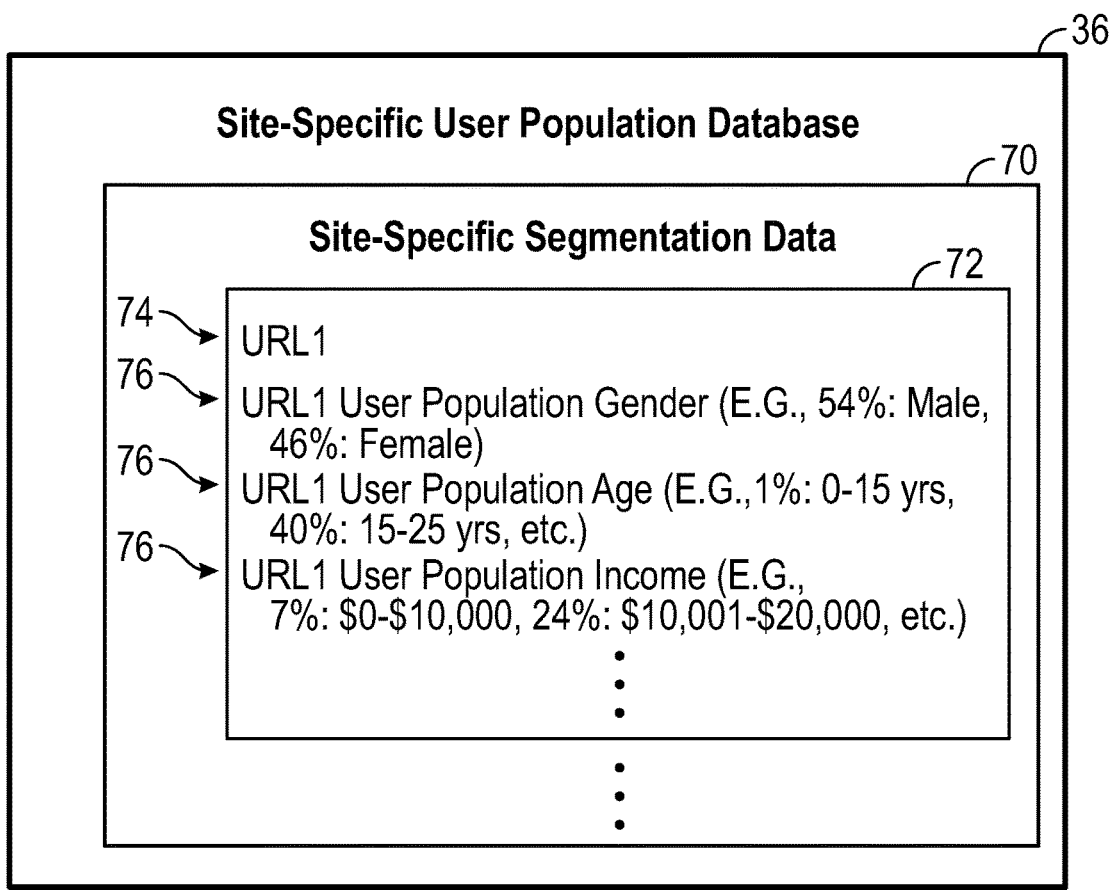
FIG. 8 is a diagram of illustrative site-specific segmentation data in accordance with an embodiment of the present invention.

FIG. 8 is a diagram of site-specific user population database 36 showing the type of data that may be stored in the database. As shown in FIG. 8, database 36 may include segmentation data that is associated with (specific to) web pages at particular URLs such as site-specific segmentation data 70. Site-specific segmentation data 70 may include a segmentation data set 72 associated with each URL. Each segmentation data set 72 may include a URL (e.g., URL1) and a statistical segmentation of the users of the web page at that URL organized into user population statistics 76.

User population statistics 76 for a URL may include user population gender percentages (e.g., 54%: Male, 46%: Female), user population age percentages (e.g., 1%: 0-15 YRS, 40%: 15-25 YRS, etc.), user population income percentages (e.g., 7%: $0-$10,000, 24%: $10,001-$20,000, etc.) or other statistics for the population of human users of the web page at that URL. As shown in the example of FIG. 8, a first URL such as URL1 may have associated URL1 USER POPULATION GENDER statistics, URL1 USER POPULATION AGE statistics, URL1 USER POPULATION INCOME statistics, or other statistics of the user population.

During operation, cookie harvesting equipment 12 may extract user population percentages such as the percentage of male users and the percentage of female users of a particular web page from statistics 76 of data 72 and use the extracted user population percentages to probabilistically select a user profile or a set of web pages to be used when generating and updating user profile cookie sets. In this way, system 10 can choose a distribution of users for exploring a web page that is statistically matched with the real human user population for that web page or a distribution of web pages to explore that are statistically matched with a particular user profile.

Site-specific segmentation data 70 may be obtained or purchased from a third party data provider such as data provider 38 of FIG. 2.

Figure 9:
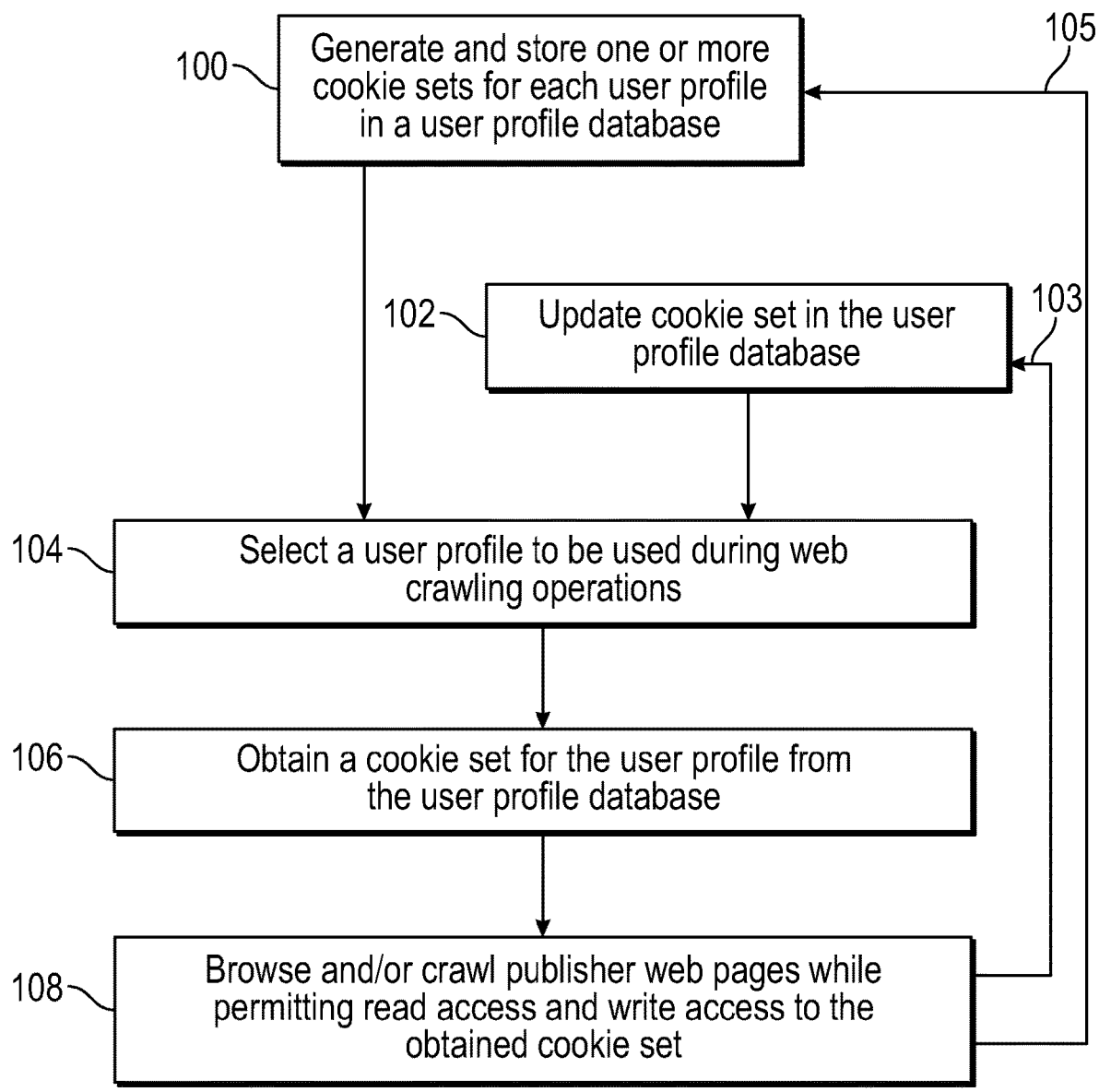
FIG. 9 is a flow chart of illustrative steps that may be used in exploring web pages using automatically generated and maintained user profile cookie sets in accordance with an embodiment of the present invention.

Illustrative steps that may be involved in generating, storing, maintaining, and updating user profile cookie sets using a system of the type shown in FIG. 1 are shown in FIG. 9.

At step 100, a system such as system 10 of FIG. 1 may be used to generate and store one or more cookie sets for each user profile in a user profile database.

At step 104, a user profile may be selected from the user profile database that is to be used for web crawling operations such as advertisement discovery and tracking operations of the type described above in connection with FIG. 3.

At step 106, a cookie set such as one of the cookie sets generated at step 100 may be obtained from the user profile database.

At step 108, a system such as system 10 of FIG. 1 or system 99 of FIG. 3 may be used to browse and/or crawl publisher web pages while permitting read access and write access to the obtained cookie set.

As indicated by line 103, a system such as system 10 may then be used to update a cookie set in the user profile database at step 102. However, this is merely illustrative. If desired, a system such as system 10 may return to step 100 and generate one or more additional cookie sets for each user profile as indicated by line 105.

If desired, the cookie set updating operations of step 102 may be performed in a common step with the browsing and crawling operations of step 108.

Figure 10:
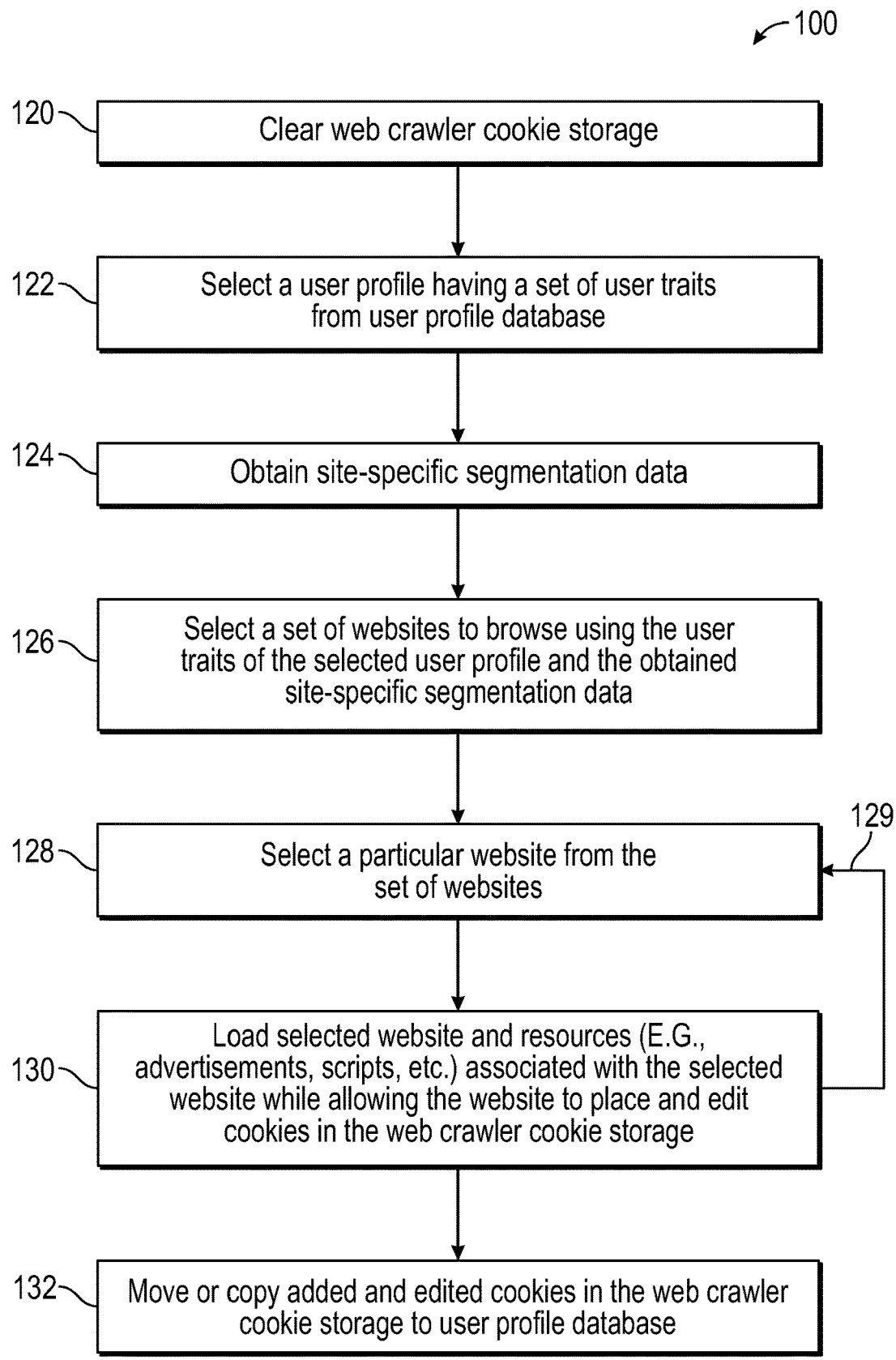
FIG. 10 is a flow chart of illustrative steps that may be used in generating and storing cookie sets for user profiles in accordance with an embodiment of the present invention.

Illustrative steps that may be involved in generating and storing cookie sets as described above in connection with step 100 of FIG. 9 are shown in FIG. 10.

At step 120, web crawler cookie storage such as cookie storage 23 of one of web crawlers 22 of equipment 12 may be cleared.

At step 122, a user profile having a set of associated user traits may be selected from a database such as user profile database 34 (FIG. 1).

At step 124, site-specific segmentation data such as data 70 of FIG. 8 may be obtained from site-specific user population database 36.

At step 126, a set of websites to be browsed during cookie set generation operations may be selected using the user traits of the selected user profile and the obtained site-specific segmentation data.

At step 128, a particular website may be selected from the set of websites to be browsed.

At step 130, the selected website and resources (e.g., advertisements, scripts, etc.) associated with the selected website may be loaded using the cookie harvesting equipment while allowing the website (e.g., the publisher server, other servers associated with assets such as HTML code, scripts, image files, videos or other assets that are linked to the website, or any other server associated with the website) to place and edit cookies in the web crawler cookie storage.

As indicated by line 129, steps 128 and 130 may be repeated (e.g., until all of the set of websites have been selected and browsed).

At step 132, the added and edited cookies in the web crawler cookie storage may be moved (or copied) to the user profile database and stored along with the associated user profile. If desired, the steps of FIG. 10 may be repeated for each user profile in the user profile database.

Figure 11:
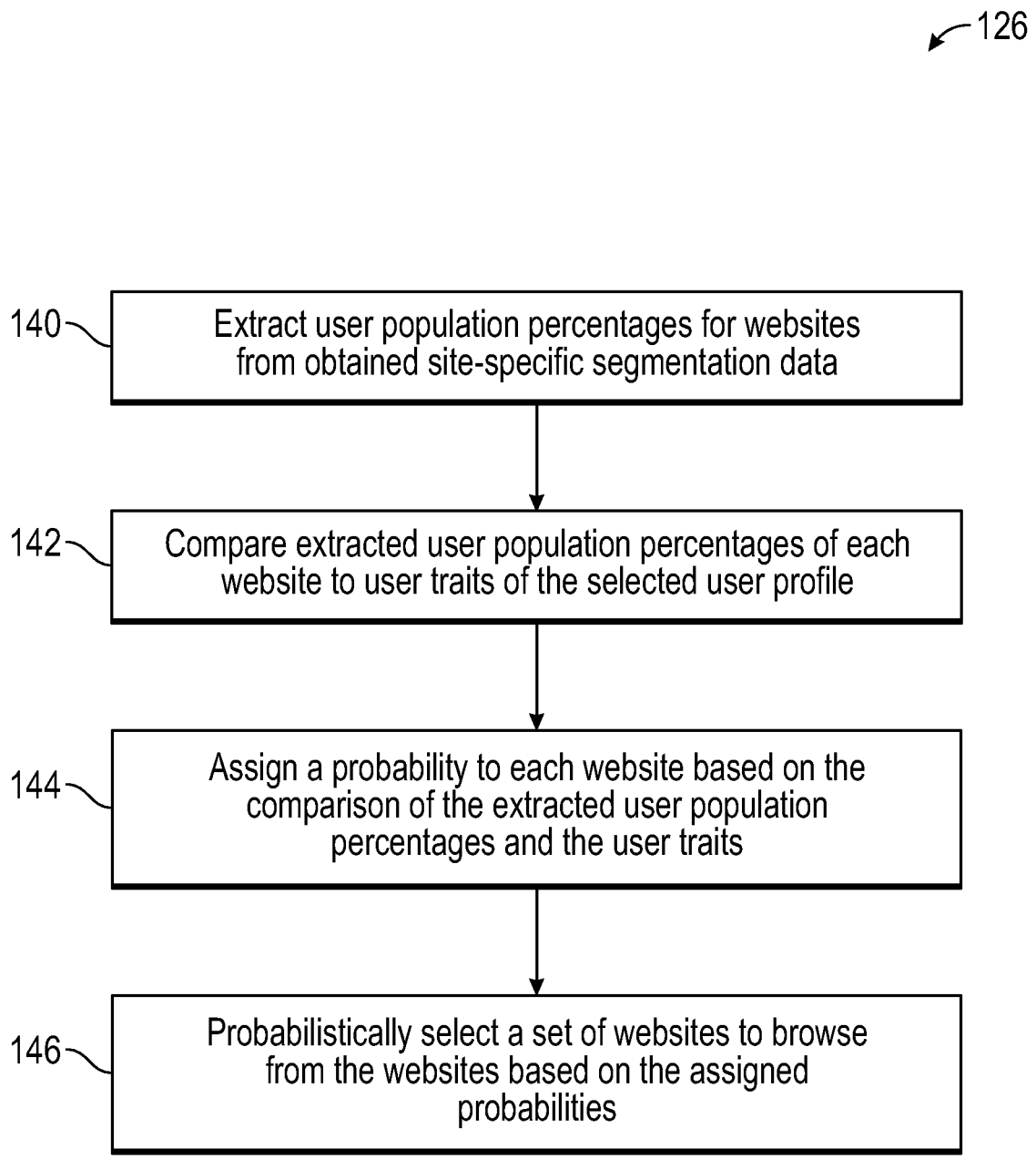
FIG. 11 is a flow chart of illustrative steps that may be used in selecting a set of websites to browse using user traits of a selected user profile and site-specific segmentation data in accordance with an embodiment of the present invention.

Illustrative steps that may be involved in selecting a set of websites as described above in connection with step 126 of FIG. 10 are shown in FIG. 11.

At step 140, user population percentages such as the percentage of users that are male and the percentage of users of the selected website that are female (as examples) of each of a plurality of websites may be extracted from the site-specific segmentation data obtained at step 124 of FIG. 10.

At step 142, the extracted user population percentages of each website may be compared to user traits of the user profile selected at step 122 of FIG. 10.

At step 144, a probability may be assigned to each of the plurality of websites based on the comparison of the extracted user population percentages and the user trait sets. For example, a user profile may have a user trait set of a female with an income of $44,000 per year. The user population percentages of a particular website may indicate, for example, that 30% of the selected website's users are female and that 40% of the selected website's users have an income range of $40,000-$50,000. System 10 may then assign a gender probability factor of 0.3 and an income probability factor of 0.4 to that website (as examples).

System 10 may then combine the gender probability factor, the income probability factor and other probability factors based on other user traits and user population percentages into a probability for that website. In the current example, the website probability may be computed as the product of the individual probability factors (e.g., website probability factor=0.3×0.4). However, this is merely illustrative. Probability factors associated with any user traits and any user population percentages may be combined in any suitable way to generate a website probability for each website and the selected user profile.

At step 146, as set of websites to browse may be probabilistically selected based on the assigned probabilities of the websites. For example, websites having a website probability of 0.9 may be more likely to be selected than websites having a website probability of 0.2. In this way, the probabilistic selection of the set of websites may be designed so that more websites having relatively high website probabilities are selected, but some websites having relatively low website probabilities are also selected.

Because a real human internet user will typically visit many websites that are associated with the traits of that user and a few other websites that are not as closely associated with the traits of that user (e.g., a middle age, high income, music enthusiast may visit many instrument retailer websites but also may occasionally visit a fertilizer website), a system such as system 10 in which low probability websites are occasionally selected, but less often than high probability websites, can more accurately simulate the cookie sets of a real human population of users.

Figure 12:
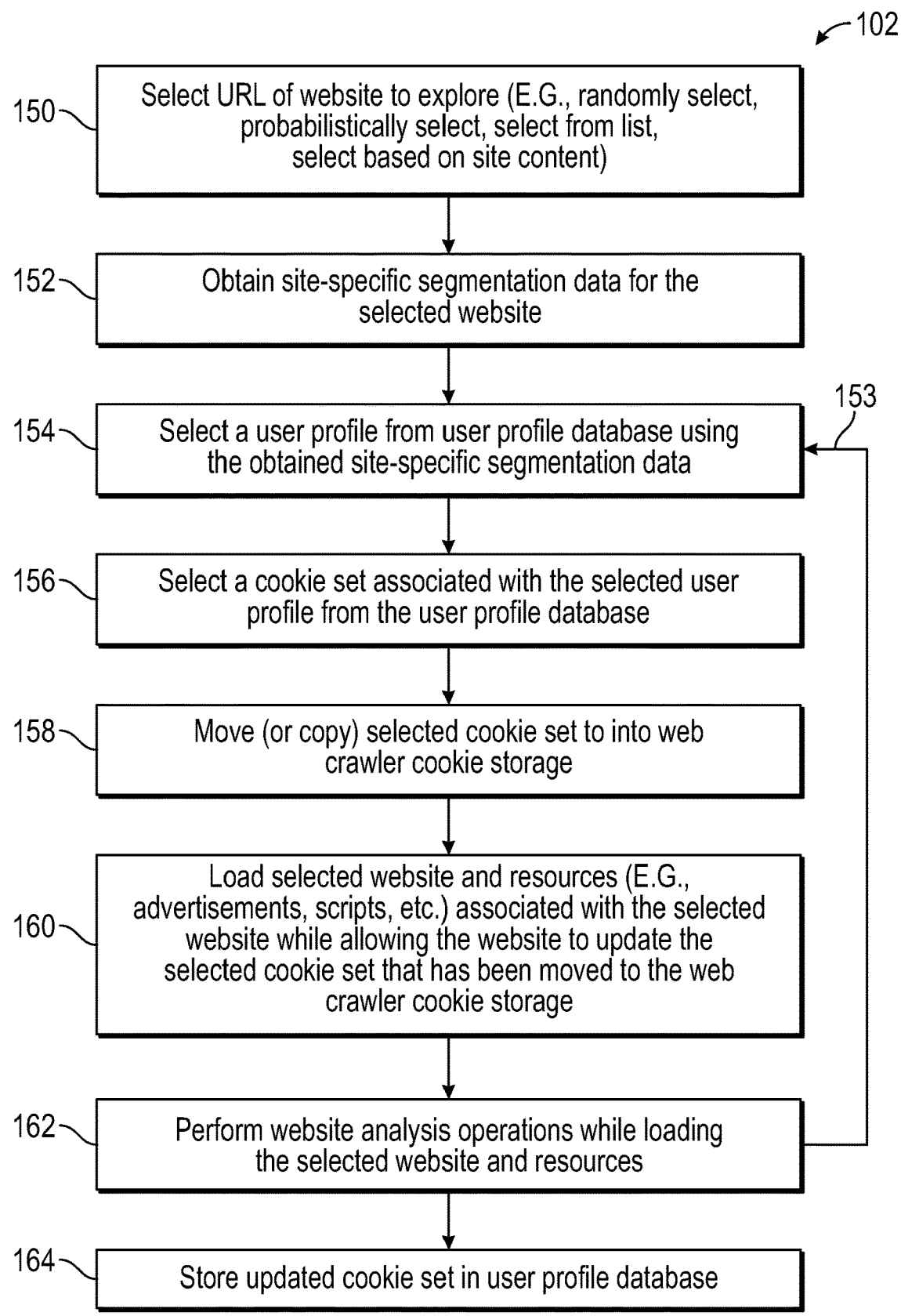
FIG. 12 is a flow chart of illustrative steps that may be used in maintaining and updating cookie sets for user profiles in accordance with an embodiment of the present invention.

Illustrative steps that may be involved in updating cookie sets as described above in connection with step 102 of FIG. 9 are shown in FIG. 12.

At step 150, a URL of a website (web page) to be explored (crawled) may be selected. The URL may be selected randomly, may be selected probabilistically based on segmentation data for the website, may be selected from a list of URLs or may be selected based on the content of the website (as examples).

At step 152, site-specific segmentation data of the type shown in FIG. 7 for the selected website (e.g., the website at the selected URL) may be obtained.

At step 154, a user profile of the type shown in FIG. 5 may be selected from user profile database 34 using the obtained site-specific segmentation data.

At step 156, a cookie set associated with the selected user profile may be selected from user profile database 34.

At step 158, the selected cookie set may be moved (or copied) from the user profile database to web crawler cookie storage such as cookie storage 23 of one of web crawlers 22 of cookie harvesting equipment 12.

At step 160, the selected website and resources (e.g., advertisements, scripts, etc.) associated with the selected website may be loaded using the advertisement discovery equipment while allowing the publisher server of the website (e.g., the publisher server, other servers associated with assets such as HTML code, scripts, image files, videos or other assets that are linked to the website, or any other server associated with the website) to update the cookie set that has been moved to the web crawler cookie storage (e.g., by placing additional cookies in the web crawler cookie storage or replacing or updating existing cookies in the web crawler cookie storage).

At step 162, if desired, website analysis operations such as advertisement discovery and tracking operations may be performed (e.g., using advertisement discovery equipment 13 of FIG. 3 and/or cookie harvesting equipment 12). However, this is merely illustrative. If desired, the cookie set in the web crawler cookie store may be updated without performing any additional website analysis operations.

As indicated by line 153, steps 154, 156, 158, 162, and (optionally) 164 may be repeated for multiple user profiles for a given selected website.

At step 164, the updated cookie set may be stored in the user profile database in connection with the selected user profile.

Figure 13:
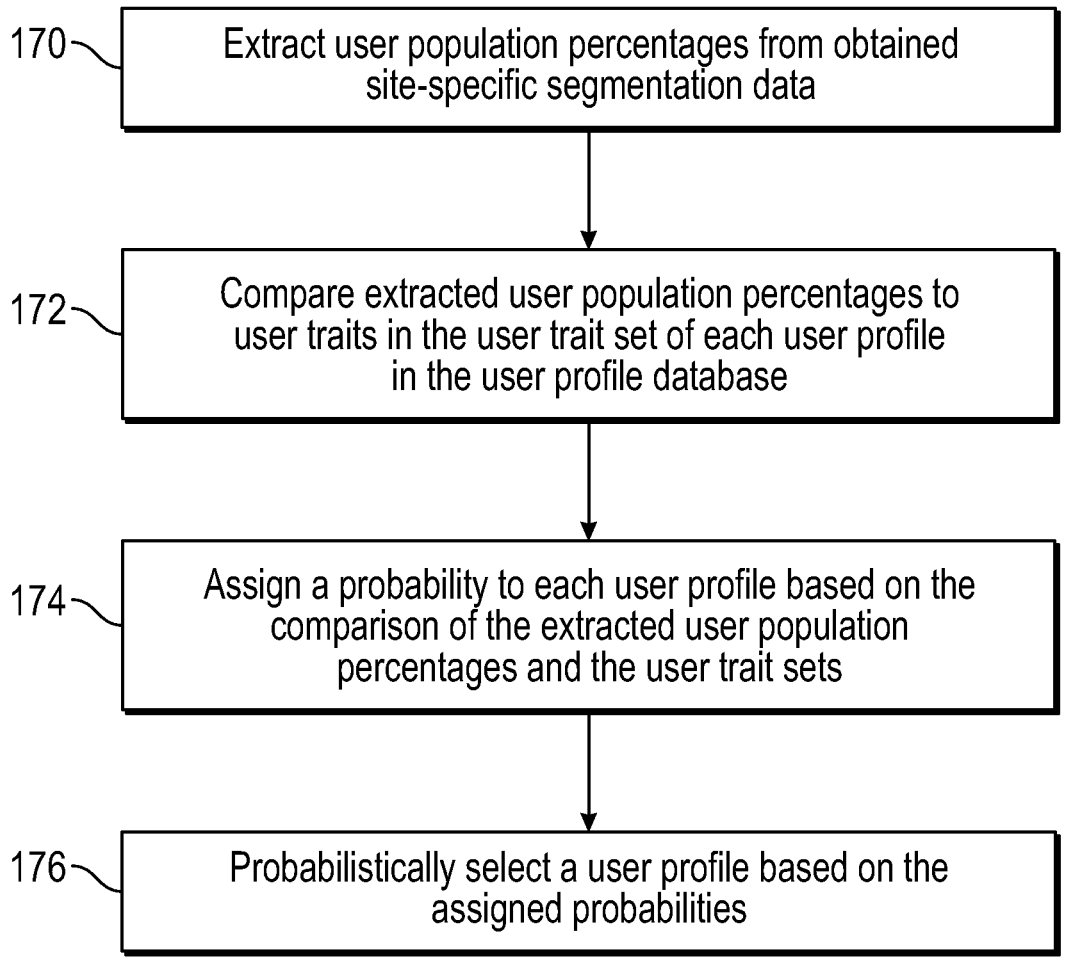
FIG. 13 is a flow chart of illustrative steps that may be used in selecting a user profile from a user profile database using site-specific segmentation data in accordance with an embodiment of the present invention.

Illustrative steps that may be involved in selecting a user profile from the user profile database using obtained site-specific segmentation data as described above in connection with step 154 of FIG. 12 are shown in FIG. 13.

At step 170, user population percentages such as the percentage of users of the selected website that are male and the percentage of users of the selected website that are female (as examples) may be extracted from the obtained site-specific segmentation data obtained at step 152 of FIG. 12.

At step 172, the extracted user population percentages may be compared to user traits in the user trait set of each user profile in the user profile database.

At step 174, a probability may be assigned to each user profile in the user profile database based on the comparison of the extracted user population percentages and the user trait sets. For example, a user profile may have a user trait set of a female with an income of $44,000 per year. The user population percentages may indicate, for example, that 30% of the selected website's users are female and that 40% of the selected website's users have an income range of $40,000-$50,000. System 10 may then assign a gender probability factor of 0.3 and an income probability factor of 0.4 to that user profile (as examples).

System 10 may then combine the gender probability factor, the income probability factor and other probability factors based on other user traits and user population percentages into a probability for that user profile. In the current example, the user profile probability may be computed as the product of the individual probability factors (e.g., user profile probability factor=0.3×0.4). However, this is merely illustrative. Probability factors associated with any user traits and any user population percentages may be combined in any suitable way to generate a user profile probability for each user profile.

At step 176, a user profile may be probabilistically selected based on the assigned probabilities of the user profiles. For example, a user profile having a user profile probability of 0.9 may be more likely to be selected than a user profile having a user profile probability of 0.2. In this way, the probabilistic selection of the user profile may be designed to that cookie sets of user profiles having relatively high user profile probabilities are updated with the cookies of a given website proportionally (for example) more often than cookie sets of user profiles having relatively low user profile probabilities are updated with the cookies of that website.

Because the cookie collections of a real human internet user can vary greatly (e.g., the cookie set of a middle age, high income, music enthusiast may include many cookies from instrument retailers but also a cookie from a fertilizer retailer), a system such as system 10 in which cookie sets of low probability user profiles are occasionally used to browse a website, but less often than cookie sets of high probability user profiles, can more accurately simulate the cookie set of a real human user.

Figure 14:
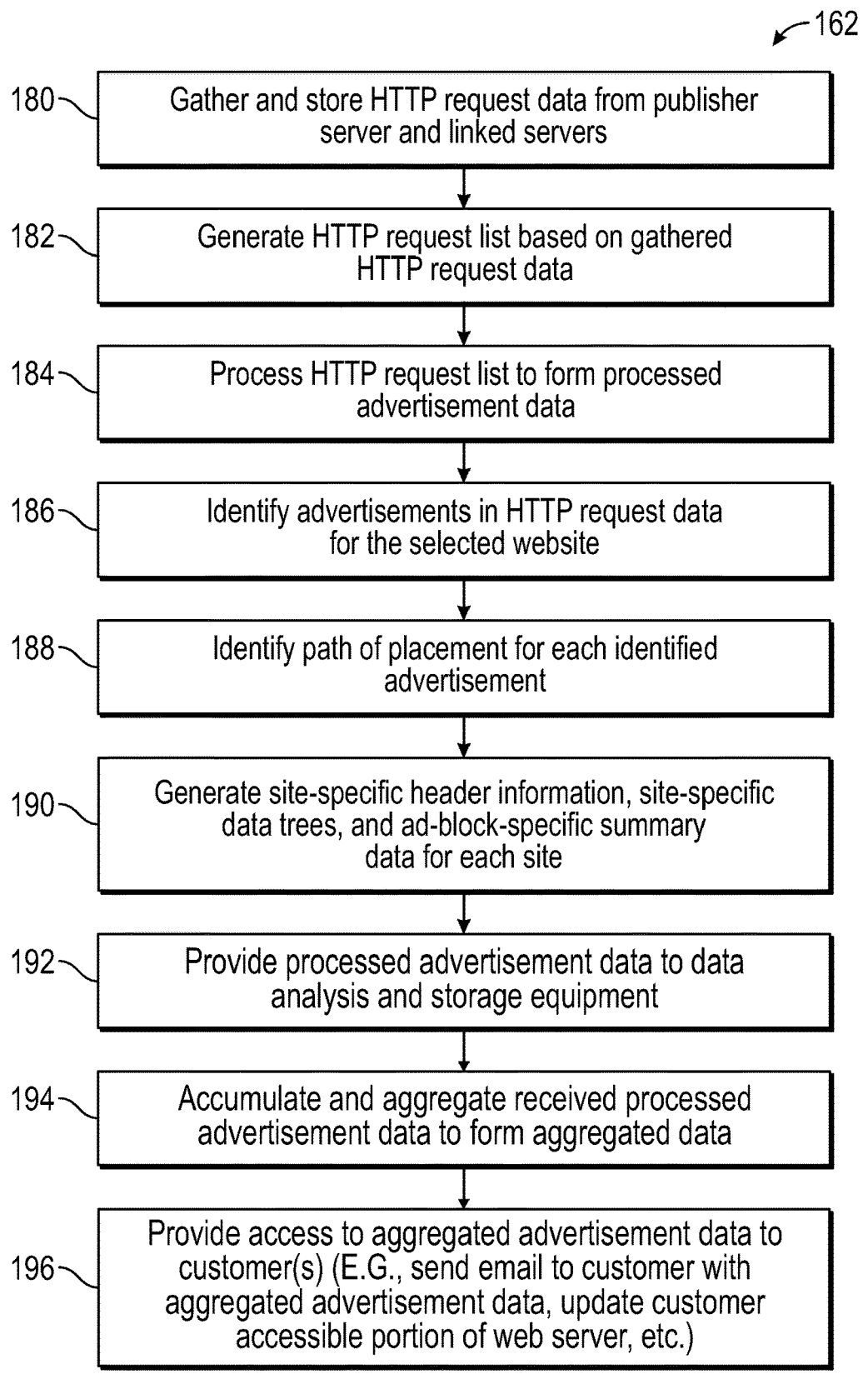
FIG. 14 is a flow chart of illustrative steps that may be used in performing website analysis operations such as advertisement tracking and discovery operations in accordance with an embodiment of the present invention.

Illustrative steps that may be involved in performing website analysis operations such as gathering and processing advertisement data as described above in connection with step 162 of FIG. 12 are shown in FIG. 14.

At step 180, HTTP request data may be gathered and stored from publisher servers and linked servers associated with selected website. HTTP request data may include information associated with each HTTP request made while loading the selected website such as the URL of the request, a time of the request, a response body of the response to the request (e.g., the HTML, JavaScript code or other code of the page associated with the request), an HTTP response code of the response to the request (e.g., a success, failure, or redirect response), and a redirect response header (e.g., a web page or other resource that a browser is redirected to in the case of a redirect response code).

At step 182, a list of HTTP requests based on the gathered HTTP request data may be generated.

At step 184, the HTTP request list may be processed to form processed advertisement data. Processed advertisement data may include grouped blocks of advertisement data such as one or more blocks of website-specific advertisement data. Website-specific advertisement data may include site-specific header information, one or more site-specific data trees, and ad-block-specific summary data associated with each advertisement block on the selected website.

At step 186, advertisements such as advertisement creatives in the HTTP request data may be identified.

At step 188, placement pathways for each identified advertisement may be identified.

At step 190, site-specific header information, one or more site-specific data trees, and ad-block-specific summary data for the selected website may be generated.

Site-specific header information may include a URL of the website and access time that the website was explored.

Site-specific data trees may include identified pathways for identified content on the selected website represented a base URL with branches, sub-branches, etc. that indicate pathways of placement for the content (e.g., cascading style sheet (CSS) files, JavaScript (JS) files, URLs, and images (e.g., joint photographic experts group (JPEG) and portable network graphics (PNG) files)) in each branch, sub-branch, etc.

Ad-block-specific summary data may include advertisement block data for each advertisement on a publisher website. Advertisement block data for each advertisement block may include an advertiser name, advertisement file information (e.g., the file size, pixel dimensions or file type of a given creative), creative files (e.g., a copy a creative image, video, animation file itself), landing pages (e.g., an advertiser webpage URL or URL of a webpage that sells the products being advertised), and page location (e.g., the pixel coordinates at which creatives are displayed) of the advertisements.

If desired, some or all of the site-specific advertisement data may be mapped to a customer-friendly name such as a name of an advertising company using a predetermined set of name-mapping rules. For example, an advertiser associated with a website with a URL of www.advertiser1.com may be associated with a customer-friendly name of ADVERTISER1. If desired, each HTTP request may be mapped to a customer-friendly name corresponding to an associated service.

Steps 180, 182, 184, 186, 188, and 190 may be performed using advertisement discover equipment 13 of system 99 of FIG. 3 and/or cookie harvesting computing equipment 12 of system 10 of FIG. 1 (if desired).

At step 192, processed advertisement data may be provided from, for example, advertising discovery equipment 12 to, for example, data analysis and storage equipment 17.

At step 194, the data analysis and storage equipment may be used to accumulate and aggregate the received processed advertisement data to form aggregated advertisement data. Aggregated advertisement data may include may include data that has been sorted and combined based upon various criteria. As examples, aggregated advertisement data may include per-site data, per-service data, per-ad-network data, per-advertiser data, per-creative data, and/or per-campaign data.

Per-site data may include processed and aggregated advertisement data that has been sorted and combined by publisher website. Per-service data may include processed and aggregated advertisement data that has been sorted and combined by advertising service (e.g., advertising networks or advertising exchanges). Per-ad-network data may include processed and aggregated advertisement data that has been sorted and combined by advertising network. Per-advertiser data may include processed and aggregated advertisement data that has been sorted and combined by advertiser. Per-creative data may include processed and aggregated advertisement data that has been sorted and combined by advertising creative. Per-campaign data may include processed and aggregated advertisement data that has been grouped by advertising campaign. An advertising campaign may include multiple advertisement creatives for a portion of an advertiser's products (e.g., a campaign for trucks made by an automaker).

At step 196, computing equipment such as customer interface equipment 18 (FIG. 3) may be used to provide access to the aggregated advertisement data (e.g., by sending an email to a customer with some or all of the aggregated advertisement data, updating a customer-accessible portion of a web server, etc.).

If desired, system 10 may be used to generate and maintain user profile cookie sets for user profiles that are specific to selected geographical locations. System 10 may generate and maintain a user profile cookie set for a user profile that is specific to a particular geographical location by loading websites (as described above in connection with step 130 of FIG. 10 or step 160 of FIG. 12) using computing equipment (e.g., proxy servers or other computing equipment) that is located in that geographical location. However, this is merely illustrative. If desired, system 10 may generate and maintain a user profile cookie set for a user profile that is specific to a selected geographical location by selecting sets of websites to browse, at least in part, by the percentage of users of that website that are located in that particular geographical region.

In this way, cookies sets may be generated that indicate to a publisher website that a simulated user lives in, primarily browses the internet from, or primarily browses websites associated with a particular geographical region.

For example, for a user profile associated with a particular city, a cookie set may be generated that includes cookies associated with websites of the newspaper, the sports team, the government offices, or other businesses, vendors or publishers associated with that particular city.

System 10 may generate and maintain user profile cookie sets for user profiles that are associated with a selected geographical location using user trait sets and site-specific user segmentation data that include geographical information.

Figure 15:
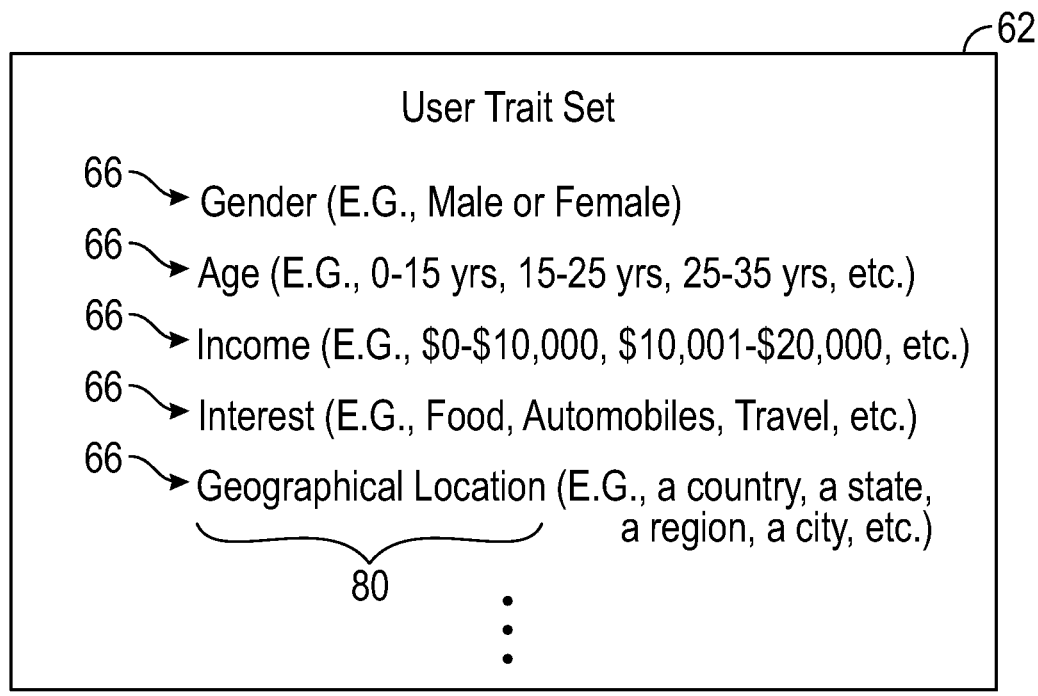
FIG. 15 is a diagram of an illustrative user trait set that includes user geographical location information in accordance with an embodiment of the present invention.

As shown in FIG. 15, user trait set 62 may include geographical location data 80 in a user trait 66. For example, geographical location data 80 may indicate the country, state, city, region, continent, or other geographical location at which the user lives, from which the user primarily browses publisher web pages, or with which the publishers of web pages the user typically browses are associated.

Figure 16:
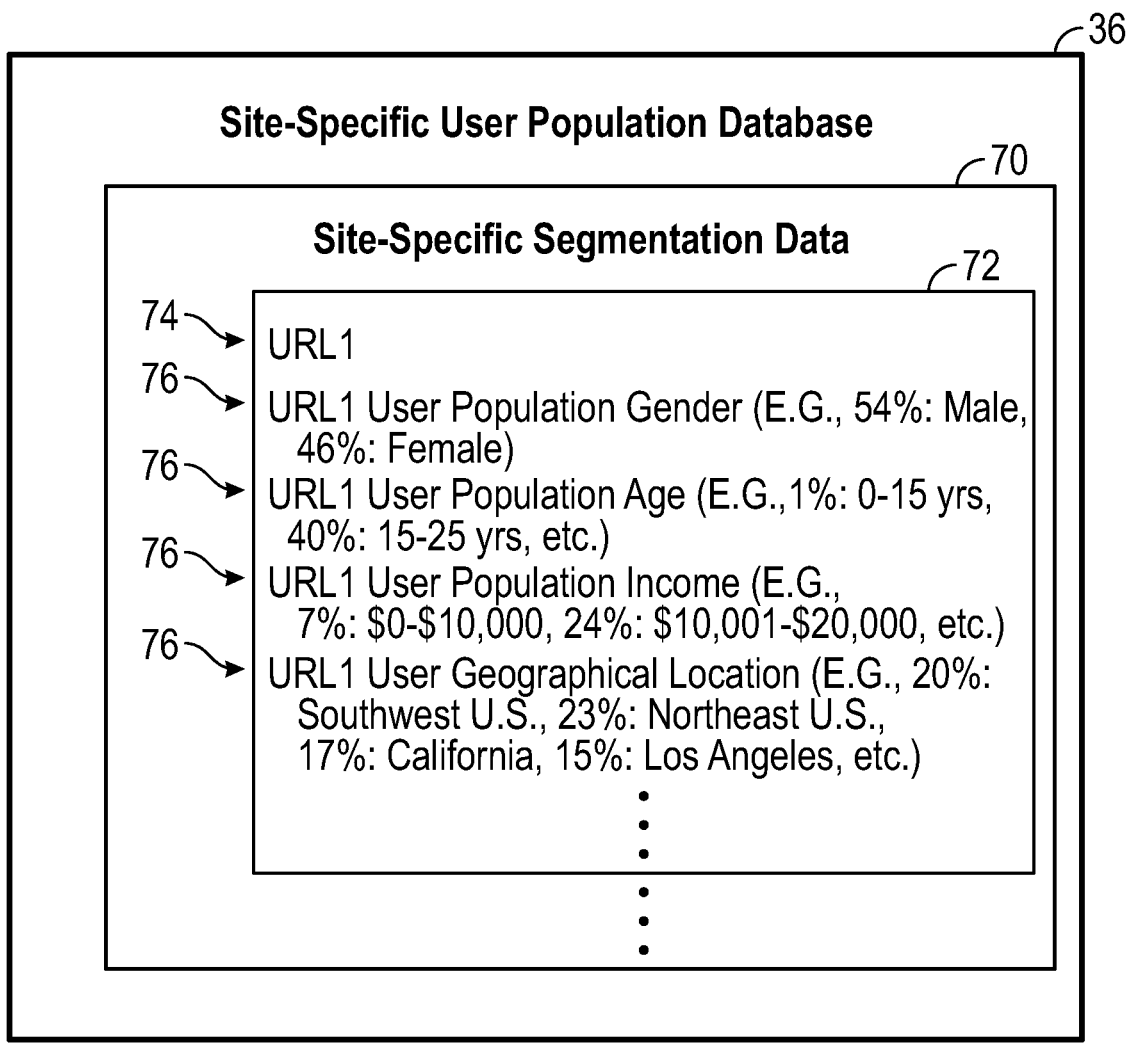
FIG. 16 is a diagram of illustrative site-specific segmentation data that includes user population geographical location information for users of each site in accordance with an embodiment of the present invention.

As shown in FIG. 16, site-specific segmentation data 70 may include geographical location data such as a site-specific user population geographical location statistic 76 that indicates the percentages of users of a selected website associated with a URL 74 that access the website from various geographical locations. In the example of FIG. 16, the first URL 74 (URL1) has associated URL1 USER POPULATION GENDER statistics, URL1 USER POPULATION AGE statistics, URL1 USER POPULATION INCOME statistics, and URL1 USER GEOGRAPHICAL LOCATION statistics (e.g., 20%: southwest U.S., 23%: northeast U.S., 17%: California, 15%: Los Angeles, etc.).

System 10 may use user trait sets and site-specific user segmentation data of the types shown in FIGS. 15 and 16 when selecting sets of websites as described above in connection with step 126 of FIG. 11 or when selecting user profiles as described above in connection with step 154 of FIG. 13.

Figure 17:
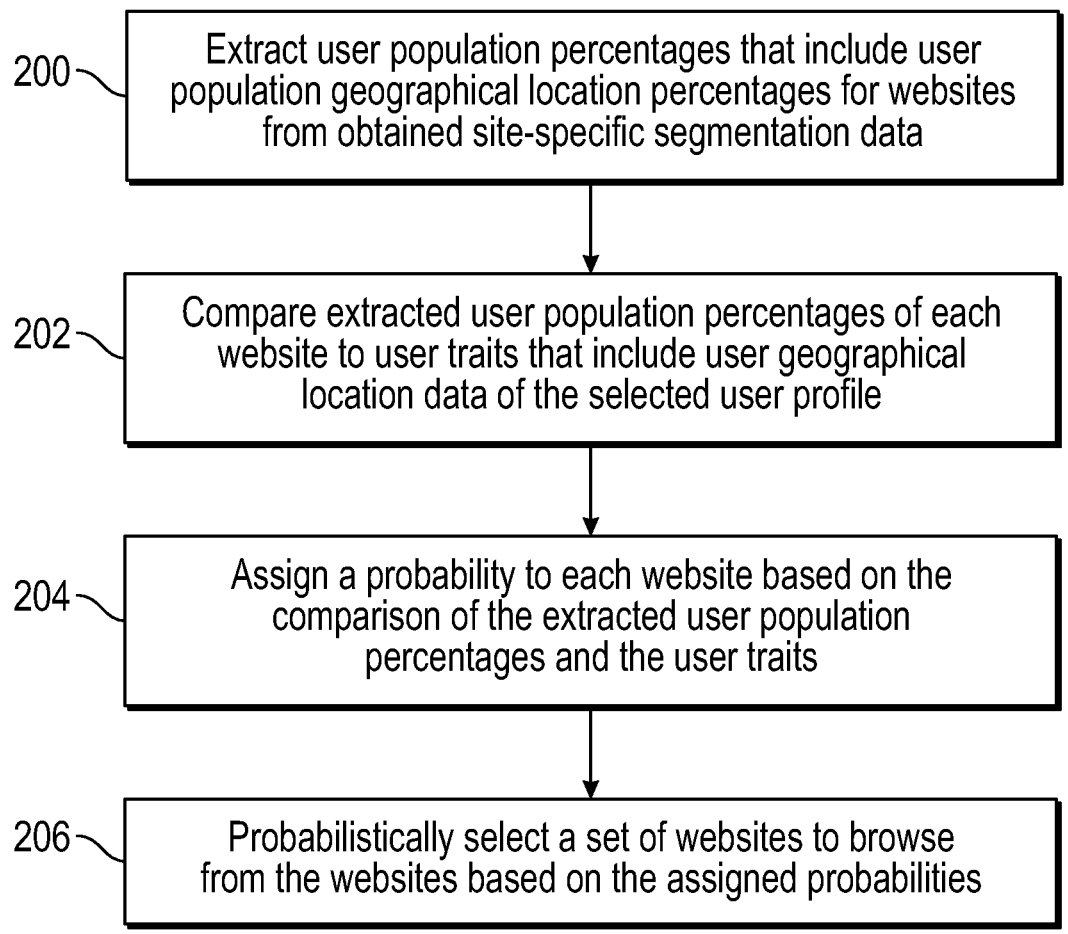
FIG. 17 is a flow chart of illustrative steps that may be used in generating and storing cookie sets for user profiles having geographical location user traits in accordance with an embodiment of the present invention.
Figure 18:
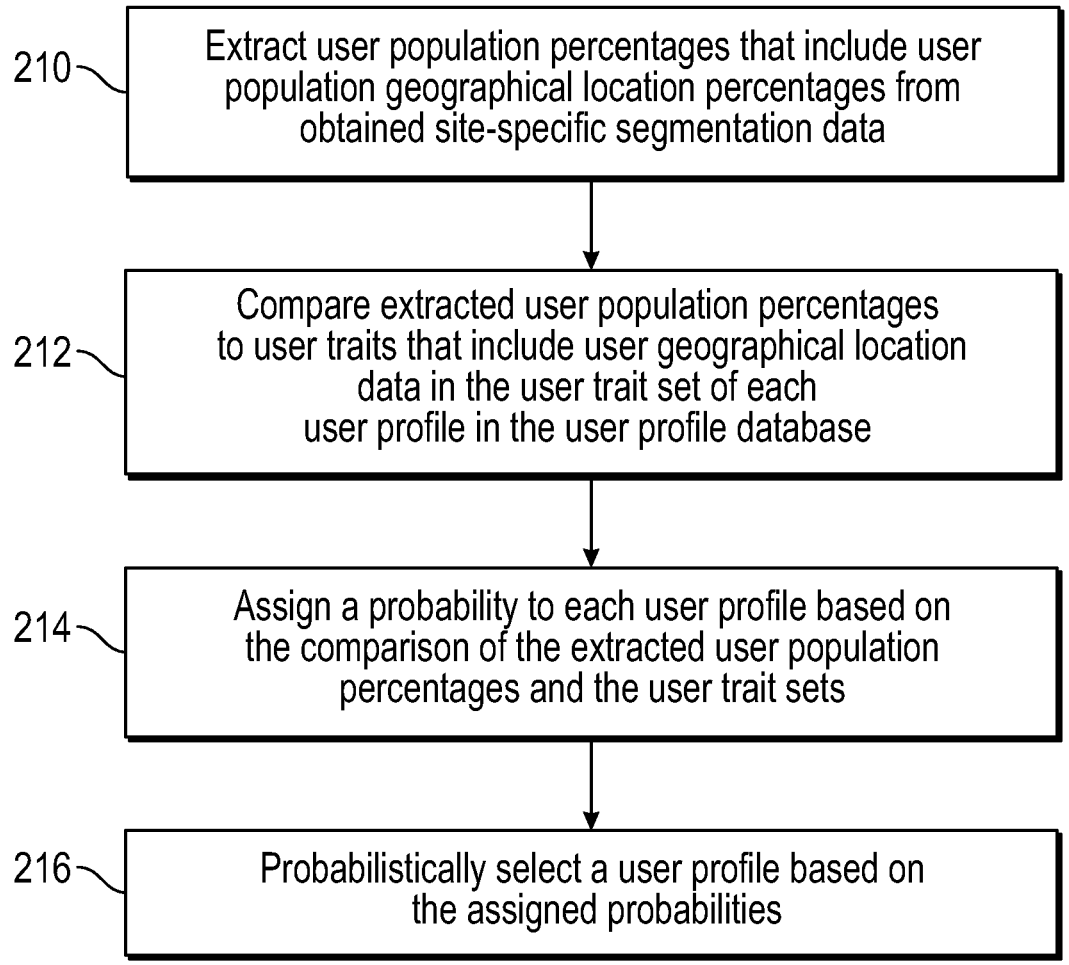
FIG. 18 is a flow chart of illustrative steps that may be used in maintaining and updating cookie sets for user profiles having geographical location user traits in accordance with an embodiment of the present invention.

FIGS. 17 and 18 are flow charts showing how system 10 may use user trait sets and site-specific user segmentation data of the types shown in FIGS. 15 and 16 when selecting sets of websites as described above in connection with step 126 of FIG. 11 (FIG. 17) or when selecting user profiles as described above in connection with step 154 of FIG. 13 (FIG. 18).

Illustrative steps that may be used in selecting sets of websites using geographical location information are shown in FIG. 17.

At step 200, user population percentages including user population geographical location percentages for users of a plurality of websites (e.g., the percentage of users that are located in (or primarily browse from) Los Angeles and New York City) may be extracted from the obtained site-specific segmentation data obtained at step 124 of FIG. 10.

At step 202, the extracted user population percentages may be compared to user traits that include a user geographical location such as geographical location data 80 of FIG. 15 of the selected user profile.

At step 204, a probability may be assigned to each of the plurality of websites based on the comparison of the extracted user population percentages and user trait set that include the geographical location data. For example, the selected user profile may have a user trait of a female with an income of $44,000 per year that primarily accesses the internet from California. The user population percentages of a particular one of the plurality of websites may indicate, for example, that 30% of the website's users are female, that 40% of the website's users have an income range of $40,000-$50,000, and that 80% of the website's users access the website from California. System 10 may then assign a gender probability factor of 0.3, an income probability factor of 0.4 to that user profile, and a geographical location probability factor of 0.9 to that website.

System 10 may then combine the gender probability factor, the income probability factor, the geographical location probability factor, and other probability factors based on other user traits and user population percentages into a probability for that website. In the current example, the website probability may be computed as the product of the individual probability factors (e.g., website probability factor=0.3×0.4×0.9). However, this is merely illustrative. Probability factors associated with any user traits and any user population percentages may be combined in any suitable way to generate a website probability for each website.

At step 206, the set of websites may be probabilistically selected based on the assigned probabilities of the plurality of websites.

Illustrative steps that may be used in selecting user profiles using geographical location information are shown in FIG. 18.

At step 210, user population percentages including user geographical location percentages such as the percentage of users of the selected website that are located in (or primarily browse from) Los Angeles and the percentage of users of the selected website that are located in (or primarily browse from) New York City (as examples) may be extracted from the obtained site-specific segmentation data obtained at step 152 of FIG. 12.

At step 212, the extracted user population percentages may be compared to user traits that include a user geographical location such as geographical location data 80 of FIG. 15 in the user trait set of each user profile in the user profile database.

At step 214, a probability may be assigned to each user profile in the user profile database based on the comparison of the extracted user population percentages and the user trait sets that include the geographical location data. For example, a user profile may have a user trait of a female with an income of $44,000 per year that primarily accesses the internet from California. The user population percentages may indicate, for example, that 30% of the selected website's users are female, that 40% of the selected website's users have an income range of $40,000-$50,000, and that 80% of the selected website's users access the website from California. System 10 may then assign a gender probability factor of 0.3, an income probability factor of 0.4 to that user profile, and a geographical location probability factor of 0.9 to that user profile.

System 10 may then combine the gender probability factor, the income probability factor, the geographical location probability factor, and other probability factors based on other user traits and user population percentages into a probability for that user profile. In the current example, the user profile probability may be computed as the product of the individual probability factors (e.g., user profile probability factor=0.3×0.4×0.9). However, this is merely illustrative. Probability factors associated with any user traits and any user population percentages may be combined in any suitable way to generate a user profile probability for each user profile.

At step 216, a user profile may be probabilistically selected based on the assigned probabilities of the user profiles as described above in connection with step 126 of FIG. 10.

The foregoing is merely illustrative of the principles of this invention and various modifications can be made by those skilled in the art without departing from the scope and spirit of the invention.

What is claimed is:

1. A method, comprising:
with cookie harvesting computing equipment, obtaining a cookie set associated with a user profile in a user profile database;
with a web crawler of the cookie harvesting computing equipment, loading a publisher website while allowing the publisher website to update the obtained cookie set;
with advertisement discovery equipment, identifying advertisements that have been placed on the publisher website by an advertisement channel that is separate from the advertisement discovery equipment, wherein at least some of the advertisements that have been placed on the publisher website are associated with the user profile;
with the advertisement discovery equipment, identifying placement pathways associated with the identified advertisements that have been placed on the publisher website by the advertisement channel; and
storing the updated cookie set in the user profile database in association with the user profile.

2. The method of claim 1, wherein obtaining the cookie set comprises selecting the cookie set from a plurality of cookie sets associated with the user profile.

3. The method defined in claim 1 wherein the user profile includes a user trait set and wherein the method further comprises selecting the user profile using the user trait set.

4. The method defined in claim 3, further comprising obtaining site-specific segmentation data for the publisher website.

5. The method defined in claim 4 wherein selecting the user profile further comprises selecting the user profile using the user trait set and the obtained site-specific segmentation data.

6. The method defined in claim 5 wherein selecting the user profile using the user trait set and the obtained site-specific segmentation data comprises:
extracting user population percentages from the obtained site-specific segmentation data; and
comparing the extracted user population percentages to the user trait set and additional user trait sets in the user profile database.

7. The method defined in claim 1, further comprising:
with data analysis and storage equipment, aggregating advertisement information that includes the identified placement pathways to generate aggregated advertisement information, wherein the aggregated advertisement information comprises at least one of per-service data, per-ad-network data, per-advertiser data, per-creative data, and per-campaign data generated by combining and sorting a plurality of identified advertisements using the data analysis and storage equipment; and
with customer interface equipment, providing a notification to a customer that includes the aggregated advertisement information.

8. A method, comprising:
loading, with a web crawler, a publisher web page at a publisher server while allowing the publisher server to update cookie storage of the web crawler;
identifying, using advertisement discovery equipment, an advertisement that has been placed on the publisher web page by an advertisement channel that is separate from the advertisement discovery equipment; and with the advertisement discovery equipment, identifying a placement pathway by which the identified advertisement was placed on the publisher web page by the advertisement channel.

9. The method of claim 8, further comprising, prior to loading the publisher web page, storing a cookie set associated with a user profile in the cookie storage of the web crawler.

10. The method of claim 9, wherein allowing the publisher server to update the cookie storage of the web crawler comprises allowing the publisher server to update the stored cookie set.

11. The method of claim 10, wherein the advertisement is associated with the user profile.

12. The method of claim 10, further comprising storing the updated cookie set, in connection with the user profile, in a user profile database.

13. The method of claim 9, further comprising, prior to storing the cookie set in the cookie storage of the web crawler, generating the cookie set based on a user trait set associated with the user profile and based on site-specific segmentation data for a plurality of publisher websites.

14. The method of claim 13, wherein generating the cookie set based on a user trait set associated with the user profile and site-specific segmentation data for a plurality of publisher websites comprises:
   selecting the user profile, with cookie harvesting computing equipment, from a plurality of existing user profiles in a user profile database, each user profile corresponding to a simulated interne user and each having a corresponding user trait set;
   obtaining the site-specific segmentation data for each of the plurality of publisher websites;
   selecting, from the plurality of publisher websites, a set of publisher websites to browse based on the user trait set for the user profile and the obtained site-specific segmentation data;
   with a web crawler of the cookie harvesting computing equipment, loading each of the selected set of publisher websites while allowing each of the selected set of publisher websites to place cookies in cookie storage of the web crawler of the cookie harvesting computing equipment; and
   storing the placed cookies in the user profile database as the cookie set for the user profile.

15. The method of claim 8, wherein identifying the placement pathway comprises identifying a site-specific data tree for the identified advertisement, and wherein the site-specific data tree comprises a base uniform resource locator (URL) associated with a corresponding advertisement creative and branches indicating the placement pathway of the corresponding advertisement creative.

16. A system, comprising:
   a user profile database storing a plurality of user profiles and at least one cookie set associated with each user profile; and
   at least one processor configured to:
      store a cookie set of a selected one of the user profiles in cookie storage of a web crawler;
      load a publisher web page at a publisher server while allowing the publisher server to update the cookie set;
      identify an advertisement that has been placed on the publisher web page by an advertisement channel that is separate from the at least one processor; and
      identify a placement pathway by which the identified advertisement was placed on the publisher web page by the advertisement channel.

17. The system of claim 16, wherein the at least one processor is configured to identify the placement pathway by identifying a site-specific data tree for the identified advertisement, and wherein the site-specific data tree comprises a base uniform resource locator (URL) associated with a corresponding advertisement creative and branches indicating the placement pathway of the corresponding advertisement creative.

18. The system defined in claim 16, further comprising:
   a database storing site-specific segmentation data that is specific to each of a plurality of publisher websites, wherein the site-specific segmentation data for each publisher website includes user population statistics related to a population of human users of that website.

19. The system of claim 18, wherein the at least one processor is further configured to generate the at least one cookie set associated with each user profile at least in part by selecting a plurality of publisher websites to crawl based on the site-specific segmentation data and a user trait set associated with the user profile.

20. The system of claim 19, wherein the at least one cookie set associated with each user profile comprises a plurality of cookie sets associated with each user profile.

* * * * *